(12) United States Patent
Saylor

(10) Patent No.: US 9,027,105 B1
(45) Date of Patent: May 5, 2015

(54) SOCIAL NETWORK INTERACTION USING VALIDATED REPRESENTATIONS OF USER CREDENTIALS

(71) Applicant: MicroStrategy Incorporated, Vienna, VA (US)

(72) Inventor: Michael J. Saylor, Vienna, VA (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

(21) Appl. No.: 13/939,366

(22) Filed: Jul. 11, 2013

(51) Int. Cl.
*H04L 9/32* (2006.01)
*H04L 29/06* (2006.01)

(52) U.S. Cl.
CPC ...................... *H04L 63/08* (2013.01)

(58) Field of Classification Search
CPC .............................. H04L 67/306; H04L 63/08
USPC ................. 726/7; 709/224; 707/705
See application file for complete search history.

(56) References Cited

U.S. PATENT DOCUMENTS

| 2004/0056759 | A1* | 3/2004 | Ungs ............................ 340/5.74 |
| 2012/0166453 | A1 | 6/2012 | Broder |
| 2014/0101243 | A1 | 4/2014 | Naveh et al. |
| 2014/0244335 | A1* | 8/2014 | Baldwin et al. ............... 705/7.17 |
| 2014/0280530 | A1* | 9/2014 | Fremlin et al. ................ 709/204 |

* cited by examiner

*Primary Examiner* — Haresh N Patel
(74) *Attorney, Agent, or Firm* — Fish & Richardson P.C.

(57) ABSTRACT

A representation for a credential is received by a first client device. The credential is rendered on a second client device where the credential is associated with a user identity within a social networking platform. The first client device validates the representation for the credential associated with the user identity a score associated with the user identity where the score is based on data associated with a plurality of other user identifies who are members of the user identity's social network within the social networking platform. The data associated with the plurality of other user identities is based on interaction with the electronic social networking platform by the plurality of other user identities within the electronic social networking platform. The accessed score is outputted for display based on the representation for the credential associated with the user identity being validated and the score associated with the user identity being accessed.

20 Claims, 13 Drawing Sheets

SOCIAL NETWORK INTERACTION USING VALIDATED REPRESENTATIONS OF USER CREDENTIALS

BACKGROUND

An electronic social networking platform may store data about or otherwise related to social characteristics of users of the electronic social networking platform.

SUMMARY

In general, in one aspect of the subject matter described in this specification a representation for a credential is received by a first client device. The credential is rendered on a second client device where the credential is associated with a user identity within a social networking platform. The first client device validates the representation for the credential associated with the user identity a score associated with the user identity where the score is based on data associated with a plurality of other user identifies who are members of the user identity's social network within the social networking platform. The data associated with the plurality of other user identities is based on interaction with the electronic social networking platform by the plurality of other user identities within the electronic social networking platform. The accessed score is outputted for display in response to the representation for the credential associated with the user identity being validated and the score associated with the user identity being accessed.

Implementations can include one or more of the following features. For example, the accessed score may be determined to meet a predefined criterion and a request to add the user identity associated with the credential to a social network within the social networking platform of a validating user identity may be generated in response to the determination that the accessed score meets the predefined criterion where the validating user identity being associated with a user of the first client device. The accessed score may be determined to not meet a predefined criterion and validation of the credential may be denied in response to the determination that the accessed score does not meet the predefined criterion.

The accessed score may include a popularity score reflecting a measure of popularity of other user identities who are members of the user identity's social network within the social networking platform. The accessed score may include an influence score reflecting a measure of influence of other user identities who are members of the user identity's social network within the social networking platform. The accessed score may include a happiness score reflecting a measure of happiness of other user identities who are members of the user identity's social network within the social networking platform. The accessed score may include an affluence score reflecting a measure of affluence of other user identities who are members of the user identity's social network within the social networking platform.

If user of the first client device is associated with a validating user identity within the social networking platform, information identifying common friends between the validating user identity and the user identity associated with the credential may be accessed from within the social networking platform. If a user of the first client device is associated with a validating user identity within the social networking platform information related to degrees of separation between the validating user identity and the user identity associated with the credential may be accessed from within the social networking platform. The representation for a credential from the second client device may include a Quick Response code displayed on the second client device.

The accessed and outputted score may be a plurality of scores associated with the user identity where the plurality of scores are based on data associated with a plurality of other user identities who are members of the user identity's social network within the social networking platform and the data associated with the plurality of other user identities is based on interaction with the electronic social networking platform by the plurality of other user identities within the electronic social networking platform. The accessed and outputted score may include a histogram representation of the score.

Other features may include corresponding systems, apparatus, and computer programs encoded on computer storage devices configured to perform the foregoing actions.

The details of one or more implementations are set forth in the accompanying drawings and the description, below. Other features will be apparent from the description and drawings, and from the claims.

DETAILED DESCRIPTION

Figure 1:
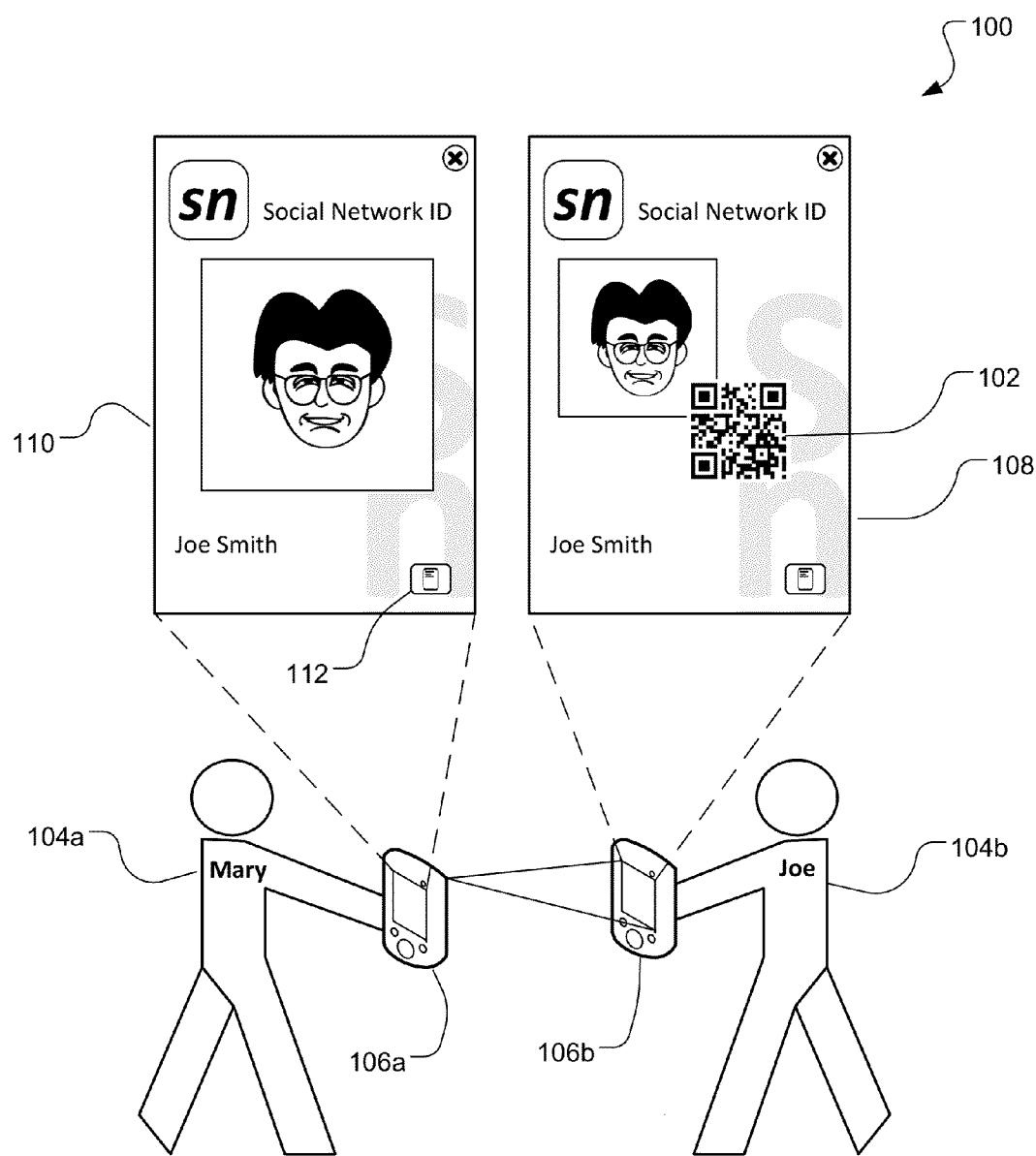
FIG. 1 shows an example process for validating a social credential.

A mobile device-based credential for a user of an electronic social networking platform may present information to others about the social proximity of the user to other users possessing one or more desired characteristics (e.g., other users who are active, communicative, popular, influential, happy, and/or affluent electronic social networking platform users). Data stored about users by the social networking platform enables quantification of various different social characteristics of the users, such as the users' activity levels, communication levels, popularity, influence, happiness, income, and/or affluence. The social proximity of an individual user to other users having one or more target social characteristics (e.g., active, communicative, popular, influential, happy, and/or wealthy users) may be determined by quantifying the target characteristics of other users to whom the individual user is connected within the electronic social networking platform.

Credentials can be maintained on and/or accessed from client devices (e.g., mobile computing devices like smart phones and tablet computers) and credentials can be represented in various forms. A server, or collection of servers, can manage and distribute credentials to appropriate users' client devices.

In some instances, representations of credentials for groups of users or for individuals are generated. The credentials can be, for example, a social credential related to user identities within one or more social networking platforms (e.g., Facebook, Twitter, LinkedIn, Google+, MySpace, Orkut, and others).

Examples of different representations for credentials and mechanisms for validating the different representations will now be described. In certain implementations, credentials can be represented by, among other representations, alphanumeric codes, optical machine-readable representations, sound signals, and/or near-field communication (NFC) signals.

A first form of representation for a credential is an alphanumeric code. As referred to herein, an alphanumeric code may be a sequence of numbers and/or letters (e.g., 4 to 24 characters) that is associated with a credential and a user. In some instances, a given alphanumeric code may be time-varying (e.g., will only be valid for a certain time period). To initialize an alphanumeric code, a server associates a given alphanumeric code with a credential, and distributes the alphanumeric code to the appropriate client device or devices.

To validate an alphanumeric code, a user or third-party presents the alphanumeric code to a validating device (e.g., a client device operated by a user or a processing system operated by a validating entity). The validating device may validate an alphanumeric code for a credential locally without requiring interaction with a server. For example, the representation for the credential provided by the third-party may be associated with a certificate associated with the third-party (e.g., a public key infrastructure (PKI) certificate), which may be stored locally at the validating device. The validating device may then compare information decoded from the alphanumeric code with information from the certificate to determine that the alphanumeric code is valid.

Alternatively or in addition, the validating device may validate the alphanumeric code by transmitting a validation request message, which includes the alphanumeric code, to the server. When the server receives the validation request message, it attempts to confirm that the presented representation of the credential is valid. For example, the server may parse the alphanumeric code to obtain a credential identifier. The server can then access the corresponding credential using the credential identifier (e.g., from a database by querying using the credential identifier). Upon retrieving the credential, the server can determine whether the presented representation for the credential was valid by comparing data received in the validation request message (e.g., the alphanumeric code) with data associated with the retrieved credential.

Upon successful validation, the server sends the validating device a validation response indicating that the representation for the credential was valid (e.g., the presented alphanumeric code matches a valid alphanumeric code for the credential). In turn, the validating device may then provide an indication that the representation presented by the user or the third-party was valid.

Another form for a credential is an optical machine-readable representation. As referred to herein, an optical machine-readable representation of a credential may be an arrangement of graphical elements that encode alphanumeric data representing the credential, where the elements are arranged so that the data can be read by an optical scanner. For example, an optical machine-readable representation of a credential may be a bar code, a QR code, or an Aztec code, among other optical machine-readable representations. In some instances, a given optical machine-readable representation of a credential only may be valid for a certain time period. In some implementations, optical machine-readable representations of credentials may encode data including or representing credential identifiers and any other suitable data. In other implementations, optical machine-readable representations of credentials may encode other identifiers that are linked to or otherwise associated with credential identifiers.

To generate an optical machine-readable representation, a client device may use any suitable technique for encoding alphanumeric data within the optical machine-readable representation. For example, the client device may call a function or library routine that encodes QR codes in accordance with the QR code International Organization for Standardization (ISO) standard, ISO/IEC 18004:2006 RSS, Information technology—Automatic identification and data capture techniques—QR Code 2005 bar code symbology specification.

To initiate the validation process for an optical machine-readable representation, a client device may output an optical machine-readable representation to a display of the client device. A validating device can scan the portion of the client device's display showing the representation of the credential and decode the representation of the credential to generate a set of alphanumeric characters that were encoded in the representation of the credential. In particular, the validating device may output a reticle defining a field of view from a camera operatively coupled to the validating device. This reticle can be used to scan the optical machine-readable representation of the credential from the relevant portion of the client device's display.

The validating device may use any suitable mechanism to scan and decode the optical machine-readable representation of the credential. For example, the validating device may access a function or library routine that captures and decodes QR codes and/or barcodes using a camera operatively coupled to the validating device. Suitable libraries may include, for example, Red Laser or Zxing.

In some implementations, a validating device may validate a set of alphanumeric characters from an optical machine-readable representation locally without requiring interaction with a server. For example, the optical machine-readable representation for the credential may include a certificate associated with the client device of the user or third-party presenting the optical machine-readable representation for validation. Alternatively or in addition, the representation for the credential may be associated with a certificate that is already stored locally at the validating device. The validating device may then compare information decoded from the optical machine-readable representation with information from the certificate to determine that the optical machine-readable representation is valid.

Alternatively or in addition, the validating device may then validate the optical machine-readable representation of the credential by transmitting a validation request message to a server. The validation request message may include data corresponding to the alphanumeric characters that were encoded in the optical machine-readable representation of the credential. When the server receives the validation request message, it attempts to confirm that the presented representation of the credential is valid. For example, the server may parse and/or decode the alphanumeric characters to obtain a credential identifier. The server can then access the corresponding credential using the credential identifier (e.g., from a database by querying using the credential identifier). Upon retrieving the credential, the server can determine whether the presented representation for the credential was valid by comparing data received in the validation request message (e.g., the alphanumeric characters) with data associated with the retrieved credential.

Upon successful validation, the server sends the validating device a validation response indicating that the representation for the credential was valid (e.g., the alphanumeric characters in the request match a valid sequence of alphanumeric characters for the credential). In turn, the validating device may then provide an indication that the representation presented by the user or the third-party was valid.

Yet another form of representation for a credential is a sound signal. As described herein, a sound signal is an oscillation of pressure waves transmitted through the air that are modulated to encode information. Any suitable modulation scheme could be used, such as, for example, frequency shift keying (FSK) or phase-shift keying (PSK). In some implementations, the sound signal may be in the ultrasonic frequency range, e.g., greater than about 20 kHz. In some implementations, the sound signal may be in the audible frequency range, e.g., about 20 Hz to about 20 kHz.

A sound signal representing a credential may encode data including or representing a corresponding credential identifier and any other suitable data. In addition, a sound signal representing a credential may encode another identifier that is linked to or otherwise associated with a corresponding credential identifier. In some implementations, a given sound signal representing a credential may only be valid for a certain time period. For example, part of the data encoded in the signal may correspond to a time stamp, and the credential represented by the signal may be deemed invalid if a validating device attempts to decode the data more than a predetermined amount of time after the time stamp was generated.

To generate a sound signal, a client device may use any suitable technique for encoding a representation of a credential. For example, the client device may call a function or library routine that encodes data into sound signals such as the Zoosh software development kit (SDK) by Naratte, Inc. The client device can then output the sound signal representation of the credential from a speaker coupled to the client device for reception by a validating device.

To initiate the validation process for a sound signal, a client device outputs a sound signal representing a credential. A validating device may then receive the sound signal at a speaker of the validating device and decode the sound signal representation of the credential to generate a set of alphanumeric characters that were encoded in the sound signal. The validating device may use any suitable mechanism to receive and decode the sound signal.

In some implementations, a validating device may validate a set of alphanumeric characters from a sound signal locally without requiring interaction with a server. For example, the sound signal may include a certificate associated with the client device of the user presenting the sound signal for validation. Alternatively or in addition, the representation for the credential may be associated with a certificate that is already stored locally at the validating device. The validating device may then compare information decoded from the sound signal with information from the certificate to determine that the sound signal is valid.

Alternatively or in addition, the validating device may then validate the sound signal by transmitting a validation request message to a server. The validation request message may include data corresponding to the alphanumeric characters that were encoded in the sound signal. When the server receives the validation request message, it attempts to confirm that the presented sound signal is valid. For example, the server may parse and/or decode the alphanumeric characters to obtain a credential identifier. The server can then access the corresponding credential using the credential identifier (e.g., from a database by querying using the credential identifier). Upon retrieving the credential, the server can determine whether the presented representation for the credential was valid by comparing data received in the validation request message (e.g., the alphanumeric characters) with data associated with the retrieved credential.

Upon successful validation, the server sends the validating device a validation response indicating that the sound signal was valid (e.g., the alphanumeric characters in the request match a valid sequence of alphanumeric characters for the credential). In turn, the validating device may then provide an indication that the representation presented by the user or the third-party was valid.

Still another form of representation for a credential is an NFC signal. NFC as described herein may refer to a set of standards (e.g., ECMA-340 and ISO/IEC 18092) for client devices to establish radio communication with each other by touching them together or bringing them into close proximity (e.g., typically no more than a few centimeters). NFC as described herein may also include other suitable short range wireless communication protocols such as Bluetooth or Zigbee.

A client device may use any suitable technique for encoding a representation of a credential within an NFC signal, such as a function or library routine. An NFC signal representing a credential may encode data including or representing a corresponding credential identifier and any other suitable data. In addition, an NFC signal representing a credential may encode another identifier that is linked to or otherwise associated with a corresponding credential identifier. In some implementations, a given NFC signal representing a credential may only be valid for a certain time period. For example, part of the data encoded in the signal may correspond to a time stamp, and the credential represented by the signal may be deemed invalid if a validating device attempts to decode the data more than a predetermined amount of time after the time stamp was generated.

To initiate the validation process for an NFC signal, a client device transmits an NFC signal representing a credential. A validating device may then receive the signal at a receiver of the validating device and decode the NFC signal representing the credential to generate the set of alphanumeric characters encoded in the signal.

In some implementations, a validating device may validate a set of alphanumeric characters from an NFC signal locally without requiring interaction with a server. For example, the NFC signal may include a certificate associated with the client device of the user presenting the NFC signal for validation. Alternatively or in addition, the representation for the credential may be associated with a certificate that is already stored locally at the validating device. The validating device may then compare information decoded from the NFC signal with information from the certificate to determine that the NFC signal is valid.

Alternatively or in addition, the validating device may then validate the NFC signal by transmitting a validation request message to a server. The validation request message may include data corresponding to the alphanumeric characters that were encoded in the NFC signal. When the server receives the validation request message, it attempts to confirm that the presented NFC signal is valid. For example, the server may parse and/or decode the alphanumeric characters to obtain a credential identifier. The server can then access the corresponding credential using the credential identifier (e.g., from a database by querying using the credential identifier).

Upon retrieving the credential, the server can determine whether the presented representation for the credential was valid by comparing data received in the validation request message (e.g., the alphanumeric characters) with data associated with the retrieved credential.

Upon successful validation, the server sends the validating device a validation response indicating that the NFC signal was valid (e.g., the alphanumeric characters in the request match a valid sequence of alphanumeric characters for the credential). In turn, the validating device may then provide an indication that the representation presented by the user or the third-party was valid.

An exemplary process for applying the above described credential validation techniques to a credential management application is described below in reference to FIGS. 1 and 2.

FIG. 1 shows an example process 100 for validating a social credential 102. In this example, a first user 104a uses the first user's client device 106a to scan a second user's 104b social credential 102 displayed on the second user's client device 106b. The first user's client device 106a validates the second user's social credential 102 and uses the social credential 102 to access one or more scores associated with an electronic social networking platform user identity of the second user 104b.

Although not illustrated in FIG. 1, as described in greater detail below, in response to validating the second user's social credential 102, the first user's client device 106a displays the one or more scores to the first user 104a. In some implementations, the first user's client device 106a also may display a request to connect with the second user by adding the second user's user identity to the first user's social network within the electronic social networking platform. (For ease of reference, such a connection between two user identities within an electronic social networking platform may be referred to herein as a "friend" connection.)

A hypothetical interaction between two users Mary, a validator, 104a and Joe, a validatee, 104b will be used to describe an exemplary credential management application. Both the validator, Mary 104a, and the validatee, Joe 104b, may be members of at least one electronic social networking platform and each may have their own user identity within the at least one electronic social networking platform. Although the process is described with respect to the hypothetical users Mary 104a and Joe 104b, the process may be performed similarly for any users (e.g., a pair of validator and validatee users) of a credential management application.

For instance, Mary 104a meets Joe 104b at a business conference and would like to add Joe 104b as a friend in one of her social networks, but first wants to verify one or more of Joe's 104b social characteristics. Social characteristics may include scores associated with Joe's user identity within the electronic social networking platform, friend connections that Joe and Mary share within the electronic social networking platform, a social proximity score between Joe and Mary within the electronic social networking platform, and/or social proximity to other users (e.g., other users within Joe's social network) with desired characteristics or scores, for example. Mary 104a then may ask Joe 104b for his social credential 102. In response, Joe may access a credential management application on his client device 106b which may generate a representation of a social credential 102 as displayed in diagram 108, for example. The social credential 102 may be an optical-machine readable code such as the QR code shown, a sound signal, an NFC code, or an alphanumeric code, for example, that is associated with Joe's user identity in one or more electronic social networking platforms.

Mary may activate a corresponding credential management application on her client device 106a to receive (e.g., by scanning the QR code) and validate Joe's social credential 102. Validating the social credential 102 may include decoding data encoded in the social credential 102, comparing a certificate associated with the social credential 102 with data stored by the credential management application on Mary's client device 106a, or sending a validation request to a server including data that were encoded in the social credential 102 (as described above).

Successful validation of Joe's social credential 102 may allow Mary's client device 106a to access one or more social characteristics associated with Joe's user identity in an electronic social networking platform. The one or more social characteristics may include one or more scores calculated based on data associated with a plurality of other user identities who are members of Joe's social network within the electronic social networking platform. The data associated with the plurality of other user identities may be based on interactions by the other user identities with the electronic social networking platform, such as engagement with the electronic social networking platform by the plurality of other user identities or a characteristic of the plurality of other user identities within the electronic social networking platform. Furthermore, as described below in reference to FIGS. 3-5, engagement with the electronic social networking platform may include writing/responding to "status posts," performing "check-ins," and/or posting photos, for example. Additionally, as described below in reference to FIGS. 3-5, a characteristic of another user identity may be information posted in the other user identity's profile, for example.

Alternatively or in addition, successful validation of Joe's social credential 102 may allow Mary's client device 106a to access social characteristics related to Joe's user identity such as information related to similarities between Mary's and Joe's social networks within the electronic social networking platform. For example, the information may relate to friends that Mary and Joe have in common within the electronic social networking platform. In other words, user identities within the social networking platform that are members of both Mary's and Joe's social networks within the electronic social networking platform. The information related to similarities between Mary's and Joe's social network may be, for example, information related to the social proximity between Mary and Joe within the electronic social networking platform. For example, social proximity between two user identities of an electronic social networking platform may be measured in terms of the number of degrees of separation (i.e., the number of other intermediate, interconnected user identities required to form a connection) between the two user identities within the electronic social networking platform.

Upon successfully validating Joe's social credential 102, the credential management application on Mary's client device 106a may display a screen similar to screen 110 showing Joe's electronic social networking platform user identity. Screen 110 may simply display a photograph from a user profile associated with Joe's user identity or it may also include additional data from Joe's user profile. A user selectable control 112 may be selected to display one or more social characteristics associated with Joe.

In some implementations, the credential management application may generate a request to add Joe's electronic social network user identity to Mary's social network within the electronic social networking platform (i.e., a "friend" request) after successfully validating Joe's social credential 102. In some implementations, the request may only be generated if one or more of scores (described in greater detail below) associated with Joe's user identity meets one or more predefined criteria. For example, a predefined criterion may be a threshold value previously set by Mary for a particular social characteristic. For instance, Mary may be an estate planner for high net worth individuals seeking referrals to potential clients; therefore she may set a threshold for establishing friend connections with user identities having a Friends' affluence score at or above some threshold value. Alternatively or in addition, Mary may not be a highly communicative electronic social network user and may prefer to receive a moderate number of electronic social networking communications; therefore she may set a threshold for establishing friend connections with user identities having a Friends' communicativity score at or below some threshold value.

Alternatively or in addition, the predefined criteria may be a specified number of mutual friends within Mary's and Joe's social networks in the electronic social networking platform. The criteria also may be a minimum number of degrees of separation between Mary's and Joe's user identities within the electronic social networking platform or a condition that Mary and Joe have one or more specific mutual friends within the electronic social networking platform, for example. Mary may then use the credential management application to determine Joe has the potential to become a valuable business networking contact. For instance, Mary may be an entrepreneur seeking a meeting with an executive at a company that may be a potentially high value client for Mary's business. She may then set a predefined criterion to alert her if Joe, an owner of a business within the executive's industry, is friends with the executive within the electronic social networking platform.

Some implementations of the credential management application may be capable of validating a social credential that is associated with user identities in multiple electronic social networking platforms. In some implementations, validation by the credential management application may include determining if Mary (the validator) has a user identity within the same electronic social networking platform as that in which Joe's (the validatee's) user identity, as indicated by Joe's social credential, is associated. If it is determined that Mary and Joe do not both have user identities within the same electronic social networking platform, the credential management application may deny validation of Joe's social credential. For example, Joe may have a user identity within Facebook, but Mary only has a user identity within LinkedIn. Similarly, when Joe's (the validatee's) social credential is associated with a user identity in more than one electronic social networking platform, validation by the credential management application may include identifying within which of the more than one electronic social networking platforms Mary (the validator) also has a user identity. For example, Joe may have user identities within Facebook, LinkedIn and Twitter and Mary has a user identity within LinkedIn. In the case where Mary and Joe each have user identities in the same two or more electronic social networking platforms, the credential management application may request that Mary (the validator) select one of the two or more electronic social networking platforms for which to validate Joe's (the validatee's) social credential. For example, Joe may have user identities within Facebook, LinkedIn and Twitter and Mary may have user identities within Facebook, LinkedIn, and Google+.

Figure 2A:
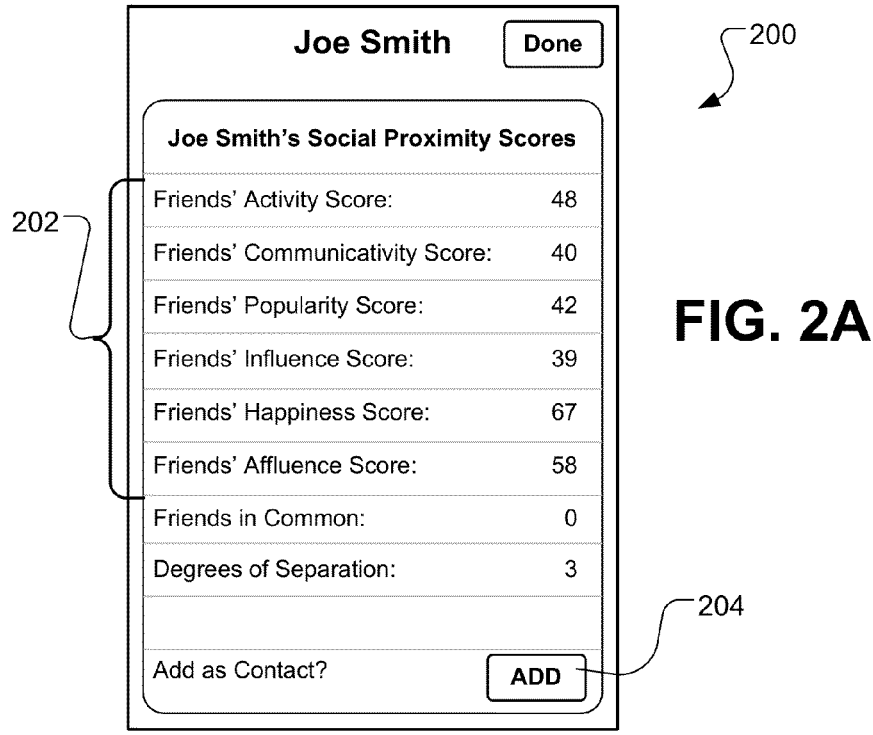
FIGS. 2A-2C are diagrams of examples of graphical user interfaces (GUIs) for an example credential management application.
Figure 2B:
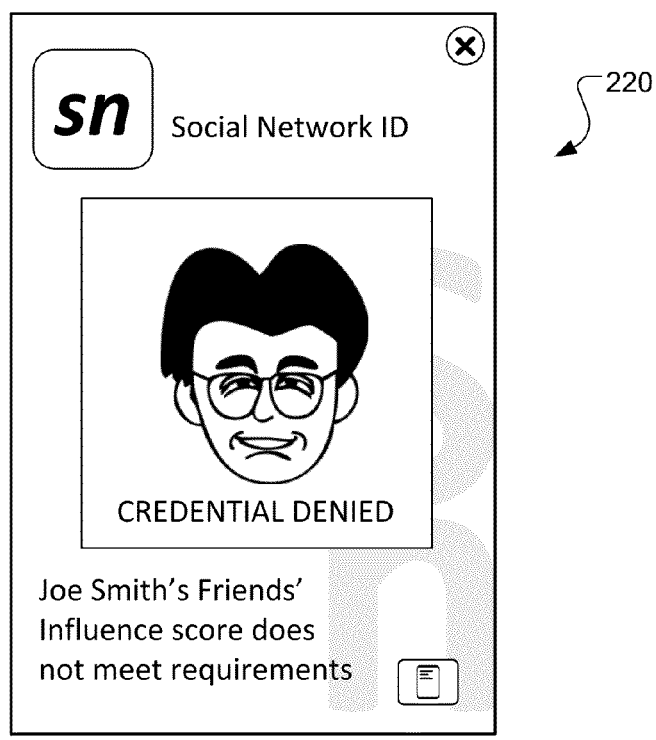
Figure 2C:
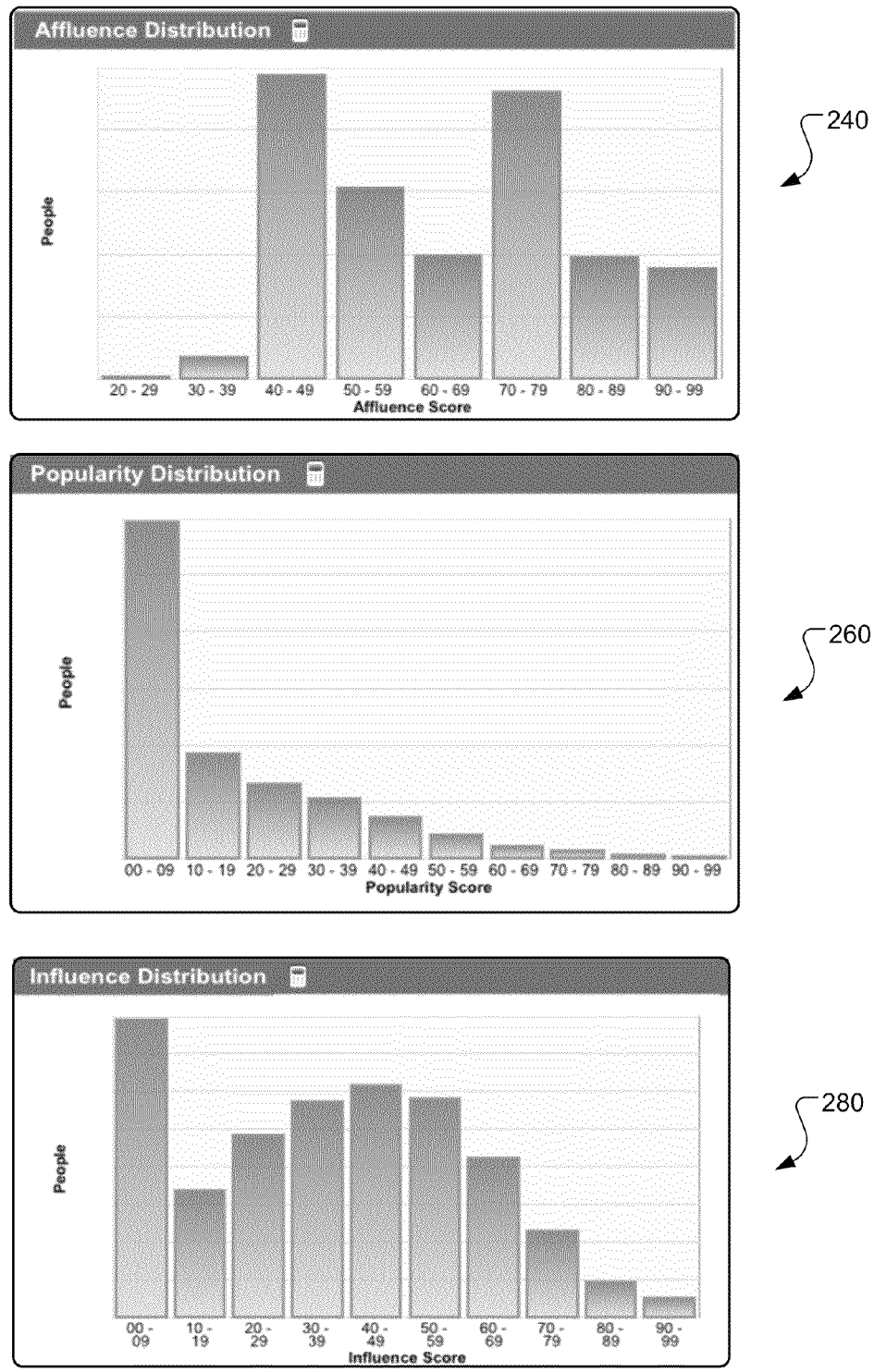

FIGS. 2A-2C are diagrams of examples of graphical user interfaces (GUIs) for an example credential management application. FIG. 2A is an example GUI 200 that may be displayed after receiving a user selection of control 112. GUI 200 illustrates an example list of scores 202 that may be calculated based on data associated with a plurality of other uses identities who are members of Joe's social network within the electronic social networking platform. For example, the scores may include a Friends' Activity score, a Friends' Communicativity score, a Friends' Popularity score, a Friends' Influence score, a Friends' Happiness score, or a Friends' Affluence score. The scores may be an average or weighted average of scores calculated for individual user identities that are members of Joe's social network within the electronic social networking platform. (A detailed description of calculating individual scores is described below.) For example, a Friends' Activity score may represent an average of the individual activity scores for all or a subset of all the user identities that are members of Joe's social network within the electronic social networking platform. The score values may be represented, for example, numerically (as shown) or graphically by a number of icons (e.g., four out of five stars). Furthermore, the values may range from 0 to 100, 1-10, or other similar ranges, for example. The list of scores 202 may include any subset of the listed scores or additional scores not listed.

In addition GUI 200 may include the number of friends that validator and validatee (Mary and Joe) have in common within their respective social networks in the electronic social networking platform and/or the number of degrees of separation between the two users' user identities within the electronic social networking platform. In addition to displaying the number of degrees of separation between the two users' user identities, one or more paths may be displayed that connect the two user identities with the fewest degrees of separation within the electronic social networking platform. In some implementations, GUI 200 may include a request 204 to add Joe to Mary's social network within the electronic social networking platform. In some implementations, the request 204 is only generated and displayed if one or more of the validatee's scores meet predefined criteria. In some implementations, data from a user profile associated with the validatee's electronic social networking platform user identity also may be displayed (e.g., the user identity's age, relationship status, education history, etc.). FIG. 2B is an example GUI 220 which may be displayed if one or more of Joe's scores do not meet a predefined criteria and, as a result, Joe's credential is not validated.

In some implementations, a more detailed view of the scores 202, such as a histogram as illustrated in FIG. 2C, may be displayed for any of the scores 202 by, for example, by selecting one of the scores 202 listed on GUI 200. As illustrated in FIG. 2C, GUI 240 includes an "Affluence Distribution" panel that presents a histogram reflecting the distribution of the affluence scores of the user identities from Joe's social network within the electronic social networking platform for whom the application was able to calculate affluence scores.

In addition, GUI 260 includes an "Influence Distribution" panel that presents a histogram reflecting the distribution of the influence scores of the user identities from Joe's social network within the electronic social networking platform for whom the application was able to calculate influence scores.

Finally, GUI 280 includes a "Popularity Distribution" panel that presents a histogram reflecting the distribution of the popularity scores of the user identities from Joe's social network within the electronic social networking platform for whom the application was able to calculate popularity scores. Although FIG. 2C depicts exemplary histogram representations for Affluence, Influence, and Popularity scores, a more detailed representation of the data related to any score may be displayed. Furthermore, representations of score data other than histograms may be displayed.

In order to calculate the scores described above, an application may extract data from an electronic social networking platform on behalf of users of the application who also are represented by user identities within the electronic social networking platform. The data may be extracted by a credential management application or it may be extracted by another application (e.g., a social intelligence application) from which the credential management application subsequently accesses the data. The scores also may be calculated by the other application (e.g., a social intelligence application), in which case a credential management application need only access the scores from the other application (e.g., a social intelligence application).

This data extracted from the electronic social networking platform may include data about or otherwise related to the users of the application. In addition, this data extracted from the electronic social networking platform may include data about or otherwise related to user identities within the electronic social networking platform who are members of the social networks of users of the application. After extracting this data from the electronic social networking platform, the application may process the extracted data to enable analysis of the extracted data, for example to glean intelligence about the users of the application (and/or user identities within the electronic social networking platform who are members of the social networks of the users of the application).

Techniques are described herein for extracting, analyzing, and/or acting upon data from an electronic social networking platform. These techniques are widely applicable and may be employed in connection with any of the above electronic social networking platforms or any other electronic social networking platforms.

Electronic social networking platforms often enable an individual user identity to create a user profile that reflects various different types of information about or otherwise related to the user identity. Such a profile for a particular user identity may be helpful to other user identities of the electronic social networking platform who are interested in learning more about the particular user identity. Similarly, the profile for the particular user identity may be helpful to the user identities of the electronic social networking platform who are interested in confirming that the particular user identity represents a particular human user within the electronic social networking platform.

For example, an electronic social networking platform may maintain a user profile for a user identity that reflects the user identity's name, gender, age, relationship status, education history (e.g., schools attended and/or degrees awarded), employment history (e.g., employers and/or positions held), contact information (e.g., e-mail address(es), telephone number(s), other electronic addresses, physical addresses, etc.), current residence information (e.g., city, state/territory, and/or country), hometown information (e.g., city, state/territory, and/or country), primary language, and/or sexual orientation.

Additionally or alternatively, the user identity's profile also may reflect various different interests of the user identity and/or indications of various different locations that the user identity (or another user identity, such as, for example, a member of the user identity's social network) has registered with the electronic social networking platform as locations that the user identity has visited. Such locations may include a wide variety of different types of locations, including, for example, geographic locations, such as cities, states, or countries, as well as commercial venues, businesses, or other places, such as restaurants, retail stores, parks, train or bus stations, airports, etc. For ease of reference, indications of locations registered with an electronic social networking platform as locations that a user identity has visited may be referred to herein as "check-ins," and information stored in a user identity's profile that reflects such indications of locations registered with the electronic social networking platform as locations that the user identity has visited may be referred to herein as "check-in information."

Electronic social networking platforms also typically enable an individual user identity (e.g., representing a human user who has registered with the electronic social networking platform and/or a human user who has been assigned a unique or otherwise identifying identifier by the electronic social networking platform) to establish connections with other user identities. These connections between user identities may reflect relationships between the underlying human users of the electronic social networking platform who are represented by the user identities. For example, a connection between two user identities within an electronic social networking platform may reflect a social friendship (e.g., developed through physical interaction in the real-world and/or through on-line interaction in the cyber-world) or a professional relationship between the underlying human users represented by the user identities.

In some electronic social networking platforms, user identities may be able to form connections with other user identities unilaterally. For example, an electronic social networking platform may enable a first user identity to form a connection to a second user identity simply by requesting to form a connection to the second user identity (without requiring authorization of the connection by the second user identity). Alternatively, in other electronic social networking platforms, the formation of connections between two user identities may involve bilateral participation by both user identities. For example, in such electronic social networking platforms, when a first user identity requests to form a connection to a second user identity, the electronic social networking platform may establish the connection between the first and second user identities only after receiving authorization to form the connection from the second user identity.

A user identity's social network within an electronic social networking platform may be defined based on the connections between the user identity and other user identities of the electronic social networking platform. In some cases, the social network of a particular user identity of an electronic social networking platform may be defined as the group of other user identities to whom the particular user identity is directly connected. Alternatively, in other cases, the social network of a particular user identity of an electronic social networking platform may be defined to extend beyond the group of other user identities to whom the particular user identity is directly connected to include other user identities who are within a threshold level of proximity to the particular user identity within the electronic social networking platform. For example, social proximity between two user identities of an electronic social networking platform may be measured in terms of the number of degrees of separation (or the number of other intermediate, interconnected user identities required to form a connection) between the two user identities within the electronic social networking platform, and the social network of a particular user identity within the electronic social networking platform may be defined to include a group of other user identities who are within a threshold social proximity of the particular user identity.

Commonly, an electronic social networking platform may provide a particular user identity with certain increased functionality in connection with other user identities who are members of the particular user identity's social network within the electronic social networking platform that the electronic social networking platform may not provide to the particular user identity in connection with user identities who are not members of the particular user identity's social network within the electronic social networking platform. For example, an electronic social networking platform may provide a particular user identity with one or more different mechanisms for electronically communicating or otherwise sharing content with other user identities who are members of the particular user identity's social network within the electronic social networking platform. Furthermore, an electronic social networking platform may allow a particular user identity to access more detailed profile information about other user identities who are members of the particular user identity's social network within the electronic social networking platform than the electronic social networking platform allows the particular user identity to access about user identities who are not members of the particular user identity's social network. Additionally or alternatively, an electronic social networking platform may enable a particular user identity to access "check-ins" registered with the electronic social networking platform by members of the particular user identity's social network within the electronic social networking platform, while not enabling the particular user identity to access "check-ins" registered with the electronic social networking platform by user identities who are not members of the particular user identity's social network within the electronic social networking platform.

The connections between individual user identities within an electronic social networking platform may be represented in the form of a graph, where user identities are represented by nodes and connections between user identities are represented by edges connecting the nodes. As new user identities join and other user identities stop using the electronic social networking platform and/or as new connections between user identities are formed and old connections between user identities are dissolved, this graph of interconnected user identities may change dynamically in time to represent the current state of connections between user identities within the electronic social networking platform.

For situations in which the systems discussed herein collect personal information about users, the users may be provided with an opportunity to opt in/out of programs or features that may collect personal information (e.g., information about a user's preferences or a user's current location). In addition, certain data may be anonymized in one or more ways before it is stored or used, so that personally identifiable information is removed. For example, a user's identity may be anonymized.

Figure 3A:
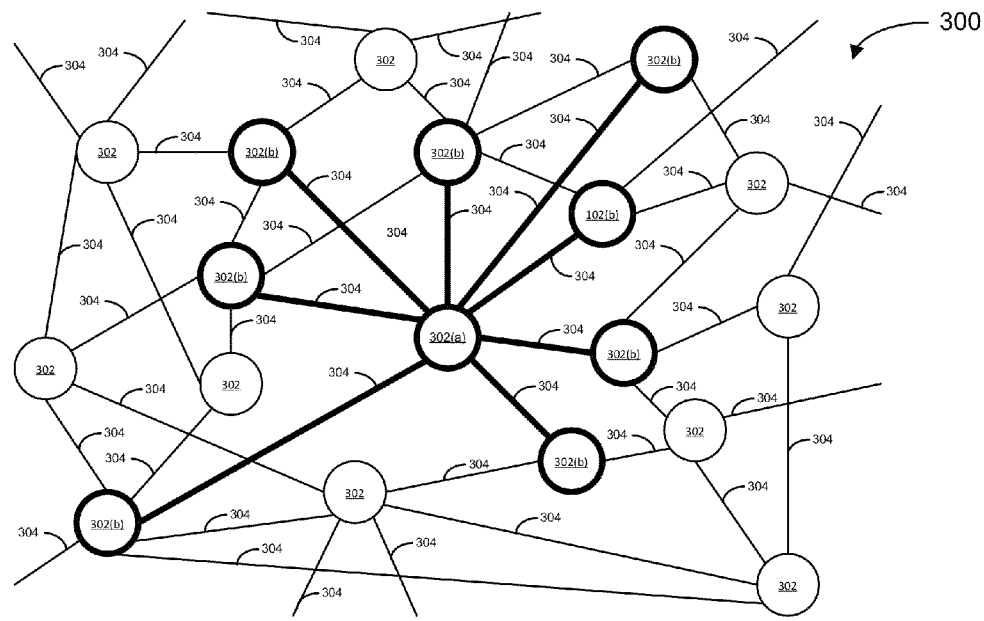
FIGS. 3A and 3B are schematic diagrams of examples of electronic social networking platforms.

FIG. 3A is a schematic diagram of an example of an electronic social networking platform. As illustrated in FIG. 3A, the electronic social networking platform is represented as a graph 300 of nodes 302 connected by edges 304. In some implementations, each node 302 of graph 300 may represent an individual user identity of the electronic social networking platform. In such implementations, an edge 304 that connects two nodes 302 represents a connection between the two user identities that are represented by the connected nodes 302. For example, the edges 304 that connect node 302(a) to nodes 302(b) represent connections between the user identity represented by node 302(a) and the other user identities represented by nodes 302(b). As discussed above, in some cases, an electronic social networking platform may define a particular user identity's social network as the group of other user identities to whom the user identity is directly connected. If this definition is applied within the electronic social networking platform illustrated in FIG. 3A, the social network for the user identity represented by node 302(a) would be defined as the group of other user identities represented by nodes 302(b).

As further discussed above, an electronic social networking platform may facilitate the sharing of information and the exchange of electronic communications between a particular user identity and other user identities who are members of the particular user identity's social network within the electronic social networking platform. For example, referring to the electronic social networking platform represented in FIG. 3A, the electronic social networking platform may provide mechanisms that facilitate the exchange of electronic communications between the user identity represented by node 302(a) and the user identities represented by nodes 302(b) who are members of the social network of the user identity represented by node 302(a). In some implementations, the electronic social networking platform may provide a mechanism that enables the user identity represented by node 302(a) to send private electronic messages to any one or more of the user identities represented by nodes 302(b). Furthermore, the electronic social networking platform also may provide a mechanism that enables the user identity represented by node 302(a) to publish an electronic message (e.g., a "status post") that is broadcast to all (or some defined subset of all) of the user identities represented by nodes 302(b). Additionally or alternatively, the electronic social networking platform may provide a mechanism that enables the user identity represented by node 302(a) to send a directed electronic message to a user identity that is represented by a particular one of nodes 302(b). In such cases, the recipient user identity of the directed message may define whether this directed message is shared publicly with other user identities of the electronic social networking platform.

In addition to enabling user identities to establish connections to other user identities, an electronic social networking platform also may enable user identities to establish connections with other types of objects. Among other examples, such other types of objects may include interest objects, location objects, event objects, and application objects.

Interest objects may represent a variety of different types of interests, including, for example, local businesses or places (e.g., restaurants, retail stores, parks, train or bus stations, airports, etc.); companies, organizations, or institutions; brands or products; artists, bands, or public figures; media or other forms of entertainment (e.g., books, music albums, movies, etc.); and causes or communities. As described in greater detail below in connection with FIG. 3A, interest objects may be manifested within an electronic social networking platform as so-called "pages" that provide information about the interests that the interest objects represent. These "pages" may be maintained by one or more representatives of the interests that the interest objects represent.

An electronic social networking platform that supports interest objects may enable an individual user identity to record various different interests within the electronic social networking platform by registering endorsements of the interest objects that represent the user identity's interests with the electronic social networking platform. The electronic social networking platform may represent the individual user identity's endorsement of different interest objects within the electronic social networking platform as connections between the user identity and the interest objects that the user identity has endorsed. Furthermore, the electronic social networking platform may provide various different mechanisms that enable the one or more representatives of a particular interest object to share electronic communications or otherwise interact with those user identities who have endorsed the particular interest object. For example, the electronic social networking platform may enable the one or more representatives of the particular interest object to publish status posts, including, for example, text, images, and/or videos that are broadcast publicly to user identities who have endorsed the particular interest object.

Location objects may represent a variety of different types of locations, including, for example, geographic locations, such as cities, states, or countries, as well as commercial venues, businesses, or other places, such as restaurants, retail stores, parks, train or bus stations, airports, etc. An electronic social networking platform that supports location objects may enable an individual user identity to form various different types of connections to different location objects. For example, an electronic social networking platform may enable a user identity to record information about the user identity's hometown by establishing a "hometown" connection with a location object that represents the user identity's hometown. Similarly, an electronic social networking platform may enable a user identity to record information about the user identity's current place of residence by establishing a "current city" connection with a location object that represents the user identity's current place of residence. Additionally or alternatively, an electronic social networking platform may enable a user identity to register locations that the user identity has visited by establishing "check-in" connections with location objects that represent locations that the user identity has visited.

In some cases, an electronic social networking platform may provide mechanisms that enable a user identity to manually "check-in" at a location. For example, a social networking platform may provide mechanisms that enable a user identity to manually define and/or search for a location object that corresponds to a location that the user identity is visiting (or has visited or plans to visit) and create a connection to the location object that corresponds to the location in order to "check-in" at the location. Additionally or alternatively, an electronic social networking platform may provide mechanisms that enable a user identity to "check-in" at a location in a more intelligent or automated fashion. For instance, a social networking platform may provide mechanisms that enable a user identity to "check-in" at a location using a mobile computing device (e.g., a smartphone or tablet computer) using global positioning system (GPS), map, and/or other location-identifying data available to the mobile computing device.

Event objects may represent events hosted by user identities of an electronic social networking platform and/or events hosted by representatives of interest objects. Furthermore, event objects may include mechanisms that enable the hosts of the events represented by the event objects to invite user identities to the events. In some electronic social networking platforms, event objects may be manifested within the electronic social networking platforms as "event pages" that provide information about the events the event objects represent (e.g., date, time, and location information for the events), and the electronic social networking platforms may enable one or more designated representatives associated with the event (e.g., the hosts) to share information and exchange electronic communications with user identities who have been invited to the event via the "event page."

An electronic social networking platform that supports event objects may establish a connection between an event object and the user identity or interest object responsible for hosting the event represented by the event object. In addition, the electronic social networking platform also may establish a connection between an event object and user identities who have been invited to the event represented by the event object and/or user identities who register with the electronic social networking platform that they will be attending the event represented by the event object.

As described in greater detail below, electronic social networking platforms may enable independent applications to leverage the electronic social networking platforms, for example, to provide more compelling user experiences for the users of the independent applications by accessing and/or extracting data from the electronic social networking platforms, generally on behalf of user identities who have granted the independent applications authorization to access and/or extract data from the electronic social networking platforms on their behalf. Application objects in an electronic social networking platform, thus, may represent different applications that leverage the electronic social networking platform.

A wide variety of different types of applications may leverage electronic social networking platforms. Among other examples, gaming applications are one common example of applications that leverage electronic social networking platforms. Such gaming applications may allow user identities to engage in interactive or multiplayer games that involve other user identities of the electronic social networking platforms that they leverage. Other examples of types of applications that may leverage electronic social networking platforms include social electronic marketplace applications, social event management applications, content delivery and sharing applications, collaboration applications, and social recommendation applications.

An electronic social networking platform that supports application objects may establish connections between an individual application that leverages the electronic social networking platform and user identities who are users of the application represented by the application object and/or who are users who have granted the application represented by the application object authorization to access or extract data from the electronic social networking platform on their behalf. Furthermore, the electronic social networking platform may provide various different mechanisms that enable an application that leverages the social networking platform to share electronic communications or otherwise interact with those user identities for whom connections have been established with the application object that represents the application within the electronic social networking platform. For example, the electronic social networking platform may enable an application that leverages the electronic social networking platform (and/or users of the application that leverages the electronic social networking platform) to transmit communications within the electronic social networking platform to user identities for whom connections have been established with the application object that represents the application within the electronic social networking platform.

Figure 3B:
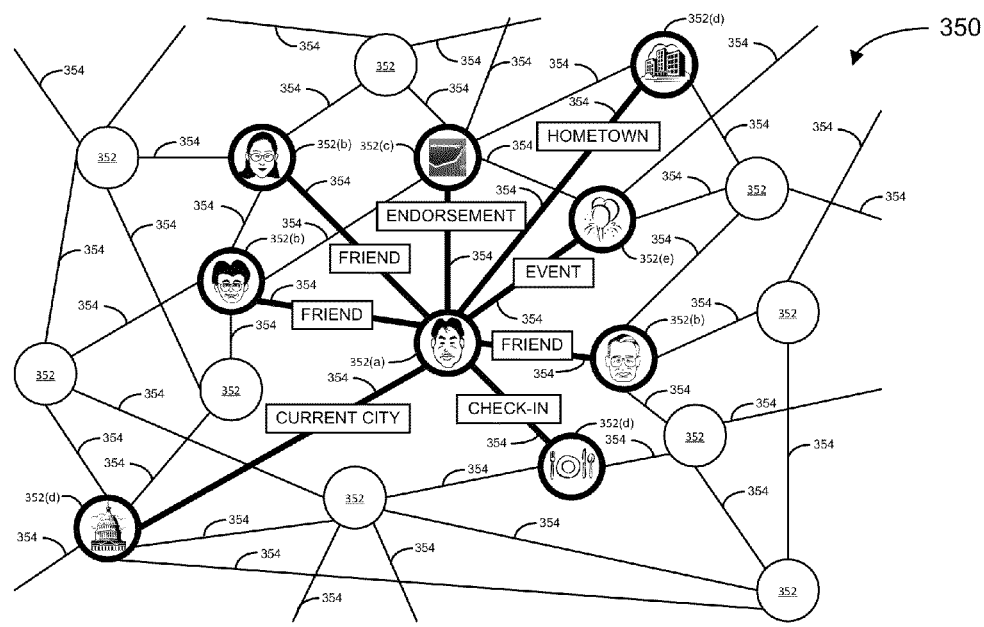

FIG. 3B is a schematic diagram of an example of an electronic social networking platform that enables user identities to form connections with multiple different types of objects including, for example, other user identity objects, interest objects, location objects, event objects, and application objects. As illustrated in FIG. 3B, the electronic social networking platform is represented as a graph 350 of nodes 352 connected by edges. Each node 352 in the graph 350 represents a particular type of object in the electronic social networking platform. For example, nodes 352(a) and 352(b) represent user identity objects, while node 352(c) represents an interest object, nodes 352(d) represent location objects, node 352(e) represents an event object, and node 354(f) represents an application object.

As illustrated in FIG. 3B, an edge 354 that connects two nodes 352 represents a connection between the two objects that are represented by the connected nodes 352. For example, the edges 354 that connect node 352(*a*) to nodes 352(*b*) represent connections between the user identity represented by node 352(*a*) and the user identities represented by nodes 352(*b*). (For ease of reference, such a connection between two user identity objects in an electronic social networking platform may be referred to herein as a "friend" connection.)

Similarly, the edge 354 that connects node 352(*a*) to node 352(*c*) represents a connection between the user identity represented by node 352(*a*) and the interest object represented by node 352(*c*). (As discussed above, a user of an electronic social networking platform may form a connection to such an interest object by endorsing the interest object. Therefore, for ease of reference, connections between a user identity object and an interest object in an electronic social networking platform may be referred to herein as an "endorsement" connection.)

Furthermore, the edges 354 that connect node 352(*a*) to nodes 352(*d*) represent connections between the user identity represented by node 352(*a*) and the location objects represented by nodes 352(*d*). Depending on the electronic social networking platform, a user identity may be able to establish various different types of connections to location objects. For example, in order to store a record of the user identity's hometown, the user identity may establish what may be referred to herein as a "hometown" connection to a location object that represents the user identity's hometown. Additionally or alternatively, in order to store a record of the user identity's current residence, the user identity may establish what may be referred to herein as a "current city" or "current residence" connection to a location object that represents the user identity's current residence. Furthermore, in order to store a record of a location the user identity visited, the user identity may establish what may be referred to herein as a "check-in" connection to a location object that represents a location that the user identity visited.

The edge 354 that connects node 352(*a*) to node 352(*e*) represents a connection between the user identity represented by node 352(*a*) and the event represented by event object 352(*e*). (For ease of reference, such a connection between a user identity object and an event object may be referred to herein as an "event" connection.) There may be various different types of event connections between user identities and event objects in an electronic social networking platform. For example, one type of an event connection between a user identity and an event object in an electronic social networking platform may signify that the user identity is the host of the event. Another type of an event connection between a user identity and an event object in an electronic social networking platform may signify that the user identity has been invited to the event. Still another type of event connection between a user identity and an event object in an electronic social networking platform may signify that the user identity has registered with the electronic social networking platform that the user identity will be attending the event. Yet another type of event connection between a user identity and an event object in an electronic social networking platform may signify that the user identity has registered with the electronic social networking platform that the user identity will not be attending the event. Still one more type of event connection between a user identity and an event object in an electronic social networking platform may signify that the user identity has registered with the electronic social networking platform that the user identity tentatively will be attending the event.

Finally, the edge 354 that connects node 352(*a*) to node 352(*f*) represents a connection between the user identity represented by node 352(*a*) and the application represented by application object 352(*f*). (For ease of reference, such a connection between a user identity object and an application objected may be referred to here as an "application" connection.)

Electronic social networking platforms may provide various different types of user interfaces for interacting with the electronic social networking platforms. For example, for each user of an electronic social networking platform, the electronic social networking platform may provide a first GUI that generally presents a feed of content shared by or otherwise related to other user identities who are members of the user identity's social network as well as content shared by or otherwise related to other objects (e.g., interest, location, event, and/or application objects) to which the user identity is connected within the electronic social networking platform. In some electronic social networking platforms, this feed may be referred to as the user identity's "news feed." In addition, the electronic social networking platform also may provide a second GUI for each user identity of the electronic social networking platform that presents a feed that generally records the activity of the user identity within the electronic social networking platform as well as content shared with the user identity directly by other user identities who are members of the user identity's social network and/or by other objects to which the user identity is connected within the electronic social networking platform (e.g., interest, location, event, and/or application objects). In some electronic social networking platforms, this feed may be referred to as the user identity's "wall" or "timeline."

An electronic social networking platform may include a variety of different content in a user identity's "news feed." For example, among other types of content, a particular user identity's "news feed" may include: (i) electronic messages, such as, for example, "status posts," and other content, such as, for example, images, videos, and/or links, that have been published generally by other user identities who are members of the particular user identity's social network; (ii) electronic messages and other content, such as, for example, images, videos, and/or links, that have been published publicly by other types of objects (e.g., interest, location, event, and application objects) to which the particular user identity is connected within the electronic social networking platform; (iii) electronic messages, such as, for example, "walls posts" or "timeline posts," and other content, such as, for example, images, videos, and/or links, that have been shared directly with recipient user identities who are members of the particular user identity's social network and who have configured their privacy settings to share such directed electronic messages and other content with the particular user identity; and/or (iv) information about activities engaged in within the context of the electronic social networking platform by other user identities who are members of the user identity's social network, such as, for example, "check-ins," events hosted and/or attended, and application usage (e.g., participation in a gaming application).

Similarly, an electronic social networking platform may include a variety of different content in a user identity's "wall" or "timeline." For example, among other types of content, a particular user identity's "wall" or "timeline" may include: (i) electronic messages, such as, for example, status posts," and other content, such as, for example, images, videos, and/or links, that the particular user identity published generally to other user identities who are members of the particular user identity's social network; (ii) electronic messages, such as, for example, "wall posts" or "timeline posts," and other content, such as, for example, images, videos, and/ or links, that the particular user identity shared directly with specific members of the particular user identity's social network; (iii) electronic messages, such as, for example, "wall posts" or "timeline posts," and other content, such as, for example, images, videos, and/or links, that user identities who are members of the particular user identity's social network shared directly with the particular user identity; (iv) electronic messages, such as, for example, "wall posts" or "timeline posts," and other content, such as, for example, images, videos, and/or links, that applications to which the particular user identity is connected within the electronic social networking platform shared directly with the particular user identity; and/or (v) information about activities engaged in within the context of the electronic social networking platform by the user identity such as, for example, "check-ins," events hosted and/or attended, and application usage (e.g., participation in a gaming application).

Figure 4A:
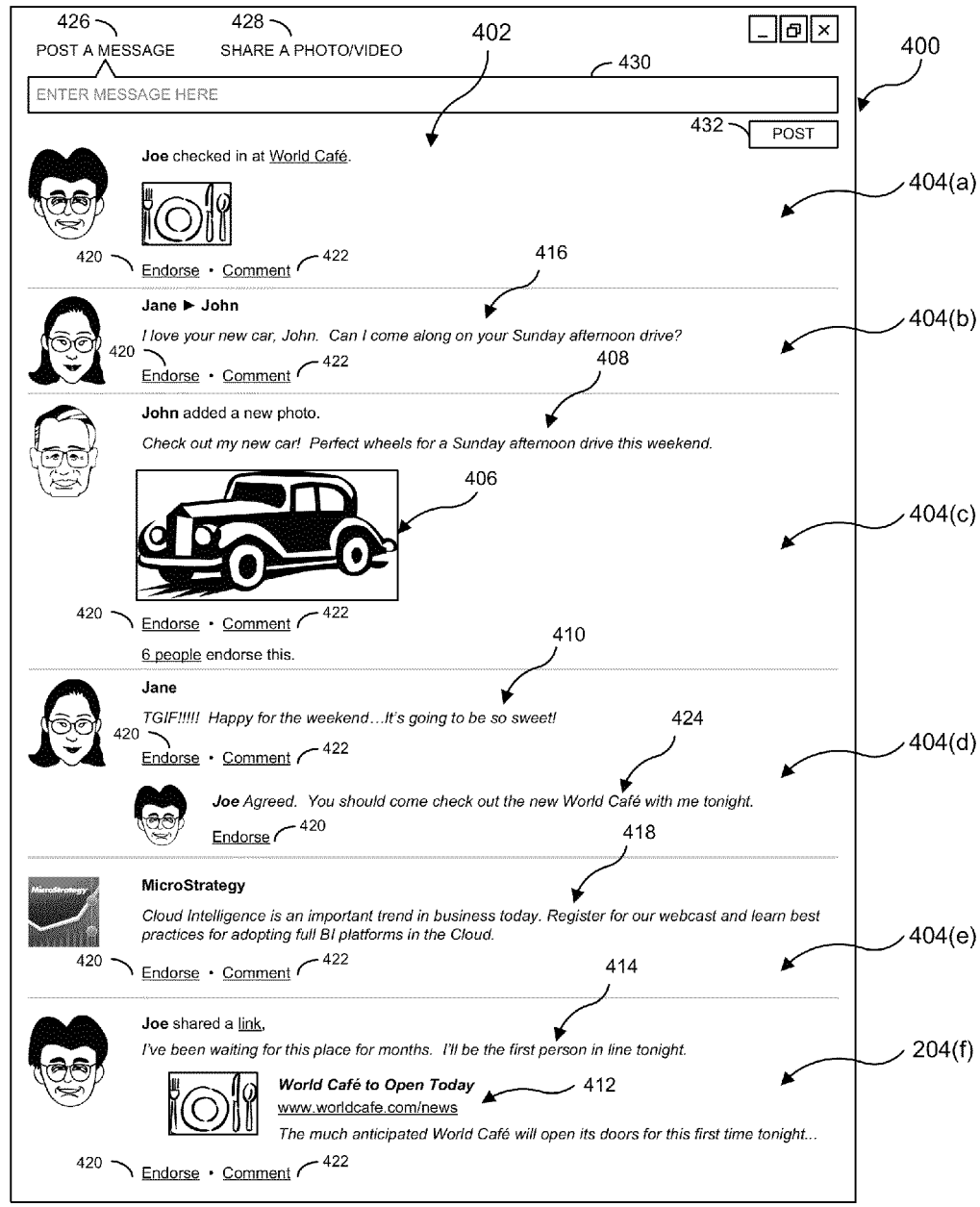
FIGS. 4A-4B and FIGS. 5A-5B are diagrams of examples of GUIs for an example of an electronic social networking platform.
Figure 4B:
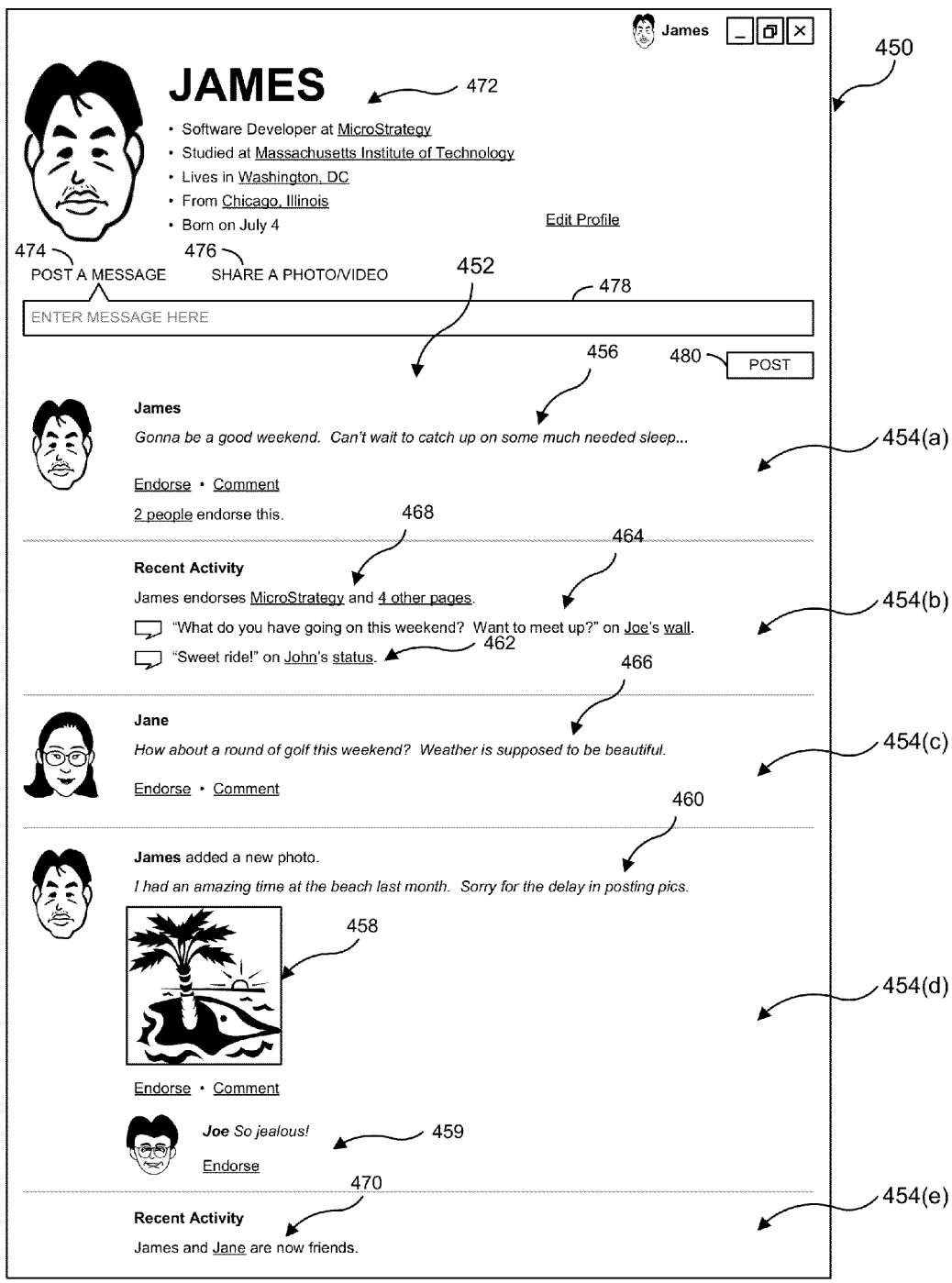

FIGS. 4A and 4B are diagrams of examples of two different GUIs 400 and 450 provided by an example of an electronic social networking platform to a user identity identified as James. The GUI 400 of FIG. 4A illustrates an example of a GUI that presents a "news feed" 402 for the user identity identified as James, while the GUI 450 of FIG. 4B illustrates an example of a GUI that presents a "wall" or "timeline" 452 for the user identity identified as James.

Referring first to FIG. 4A, GUI 400 includes a "news feed" 402 that includes different feed items 404. The items 404 included within "news feed" 402 include content and/or electronic messages that have been shared with James by other user identities who are members of James' social network as well as by other types of objects (e.g., interest, location, event, and application objects) to which James is connected within the electronic social networking platform.

For example, item 404(c) includes an image 406 and a corresponding message 408 shared with James by a member of James' social network identified as John. Similarly, item 404(d) includes a message 410 (e.g., a "status post") shared with James by a member of James' social network identified as Jane, and item 404(f) includes a hyperlink 412 to a web page and a corresponding message 414 shared with James by a member of James' social network identified as Joe. Although not illustrated in FIG. 4A, in addition to enabling user identities to share images and hyperlinks with members of their social networks (e.g., as illustrated by items 404(c) and 404(f), respectively), the electronic social networking platform also may enable user identities to share other types of content with members of their social networks including, for example, videos. Items 404(c), 404(d), and 404(f) may represent content and/or messages that the particular user identities who shared these items (i.e., John, Jane, and Joe, respectively) published generally to user identities who are members of their own social networks.

In addition to enabling user identities to publish electronic messages and other content generally to other user identities who are members of their social networks, the electronic social networking platform also may enable user identities to send directed messages and other content to individual user identities who are members of their social networks. Such directed messages and other content may be presented within the "walls" or "timelines" of the user identities to whom they are targeted. Therefore, these directed messages and other content may be referred to as "wall posts" or "timeline posts." The electronic social networking platform may provide user identities with controls for configuring whether such directed messages and other content posted to their "walls" or "timelines" also are shared with members of their own social networks. In the event that a targeted user identity selects configuration settings that provide for directed messages and other content posted to the targeted user's "wall" or "timeline" to be shared with other members of the targeted user identity's social network, such "wall posts" or "timeline posts" may be presented to the other members of the targeted user identity's social network in their "news feeds."

Item 404(b) in the "news feed" 402 of the GUI 400 is an example of a "wall post" or "timeline post" 416 that was directed to a targeted user identity who is a member of James' social network and who selected configuration settings that provide for the "wall post" or "timeline post" to be shared with other members of the targeted user identity's own social network. More particularly, message 416 was posted to the "wall" or "timeline" of a member of James' social network identified as John by another user identity identified as Jane. Because the user identity identified as John is a member of James' social network, and, because the user identity identified as John selected configuration settings that provide for "wall posts" or "timeline posts" to be shared with other members of his social network, the "wall post" or "timeline post" 416 from the user identity identified as Jane is presented in James' "news feed" 402. The user identity identified as Jane may or may not be a member of James' own social network.

"News feed" 402 also includes information about activities engaged in within the context of the electronic social networking platform by other user identities who are members of James' social network. For example, item 404(a) indicates that a user identity identified as Joe checked-in at a location identified as World Café. The location World Café may be represented as a location object within the electronic social networking platform and may correspond to, for example, a local restaurant.

The items 404 included within "news feed" 402 also include content and/or electronic messages that have been shared with James by other types of objects (e.g., interest, location, event, and application objects) to which James is connected within the electronic social networking platform. For example, item 404(e) includes a message 418 shared with James by an interest object manifested as a "page" within the electronic social networking platform that represents MicroStrategy Incorporated, a software and technology company.

The items 404 presented in "news feed" 402 provide mechanisms that enable James to react to the content included within the items 404 presented in "news feed" 402. For example, as illustrated in FIG. 4A, each of the items 404 presented in "news feed" 402 includes a selectable "Endorse" control 420 and a selectable "Comment" control 442.

A selectable "Endorse" control 420 in an item 404 enables James to register an endorsement of the content (e.g., message, image, video, link, activity, etc.) included in the item 404. The electronic social networking platform records such endorsements and may present the number of endorsements registered in connection with the content presented in an item 404 in connection with the presentation of the item 404 itself. For example, item 404(c) includes an indication that six different user identities have registered endorsements of the picture and message included in item 404(c).

A selectable "Comment" control 442 in an item 404 enables the particular user identity to enter a responsive comment to the content included in the item 404. The electronic social networking platform records such responsive comments and associates them with the content included in the item 404 so that the electronic social networking platform may present any such responsive comments in connection with the presentation of the item 404 itself. For example, item 404(d) includes a message 444 by a user identity identified as Joe that was entered in response to the message 410 originally posted by the user identity identified as Jane.

In addition to "news feed" 402, GUI 400 also includes a selectable "Post A Message" control 446, a selectable "Share A Photo/Video" control 448, and an associated text entry field 430 and selectable "Post" control 432. Selectable "Post A Message" control 446 enables James to compose and publish a "status post" by entering text in associated text entry field 430 and invoking selectable "Post" control 432. Similarly, selectable "Share A Photo/Video" control 448 enables James to share a picture or a video and to compose and publish a corresponding status post by entering text in associated text entry field 430 and invoking selectable "Post" control 432.

Referring now to FIG. 4B, GUI 450 includes a "wall" or "timeline" feed 452 that includes different feed items 454. The items 454 included within the "wall" or "timeline" feed 452 include content and/or electronic messages that the user identity identified as James shared with other members of his social network. Such content and/or electronic messages may include status posts that James published generally to members of his social network, responsive comments that James entered in response to content and/or messages shared by other user identities who are members of James' social network, and "wall" or "timeline" posts that James posted to the "walls" or "timelines" of specific user identities who are members of his social network.

For example, item 454(*a*) includes a "status post" 456 that James published generally to user identities who are members of his social network. Similarly, item 454(*d*) includes an image 458 and a corresponding message 460 that James published generally to user identities who are members of his social network. In the event that user identities who are members James' social network enter responsive comments to and/or endorse "status posts" that James published generally to user identities who are members of his social network, any such responsive comments or endorsements also may be presented within "wall" or "timeline" feed 454. For example, item 454(*a*) includes an indication that two user identities have endorsed message 456. Similarly, item 454(*d*) includes a message 459 that was entered by a user identity who is a member of James' social network identified as Joe in response to the picture 458 and corresponding message 460 originally posted by James.

Meanwhile, item 454(*b*) includes a responsive comment 462 that James posted in response to content and/or a message shared by a user identity who is a member of James' social network identified as John. Item 454(*b*) also includes a "wall post" or "timeline post" 464 that James posted on the "wall" or "timeline" of a specifically-targeted user identity who is a member of James' social network identified as Joe.

The items 454 included in "wall feed" or "timeline feed" 452 also include content and/or messages that were posted directly on James' "wall" or "timeline" by user identities who are members of James' social network. For example, item 454(*c*) includes a message 466 that was posted directly on James' "wall" or "timeline" by a user identity who is a member James' social network identified as Jane.

In addition, the items 454 in "wall" or "timeline" feed 452 also include information about activities that James has engaged in within the context of the electronic social networking platform. For example, item 454(*b*) includes an indication 468 that James has endorsed the MicroStrategy Incorporated interest object as well as four additional interest objects, all of which, as described in greater detail below in connection with FIG. 5A, may be manifested within the electronic social networking platform in the form of individual "pages." Meanwhile, item 454(*e*) includes an indication 470 that James has established a connection within the electronic social networking platform to the user identity identified as Jane.

Although not illustrated in FIG. 4B, a user identity's "wall" or "timeline" feed also may include content and/or messages that were shared with the user identity as a consequence of the user identity's interaction with an application that leverages the electronic social networking platform. For example, in some cases, an application that leverages the electronic social networking application may post messages to the user identity's "wall" or "timeline." Additionally or alternatively, another user identity may originate a message to the user identity within an application that leverages the electronic social networking platform, and the application then may cause the message from the other user identity that originated within the application to be posted to the user identity's "wall" or "timeline."

In addition to "wall" or "timeline" feed 452, GUI 450 also includes a profile section 472 that presents a snapshot of profile information for the user identity identified as James. As illustrated in FIG. 4B, profile section 472 includes information about James' employment history (software developer at MicroStrategy), education history (Massachusetts Institute of Technology), current residence (Washington, D.C.), hometown (Chicago), and birthday (July 4).

As with GUI 400, GUI 450 also includes a selectable "Post A Message" control 474, a selectable "Share A Photo/Video" control 476, and an associated text entry field 478 and selectable "Post" control 480. Selectable "Post A Message" control 474 enables James to compose and publish a "status post" by entering text in associated text entry field 478 and invoking selectable "Post" control 480. Similarly, selectable "Share A Photo/Video" control 476 enables James to share a picture or a video and to compose and publish a corresponding "status post" by entering text in associated text entry field 478 and invoking selectable "Post" control 480.

Figure 5A:
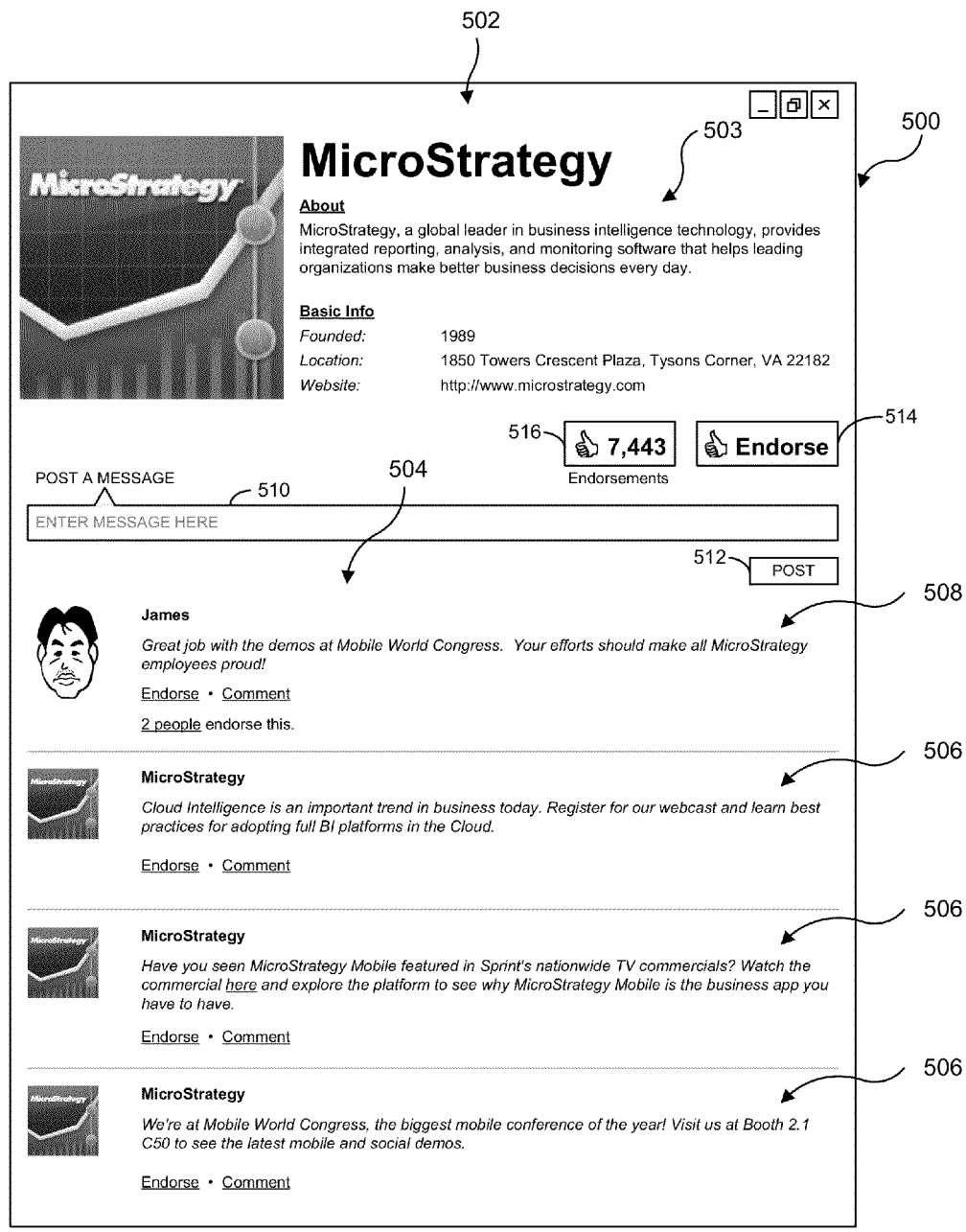

As discussed above, in some electronic social networking platforms, interests may be represented as interest objects that are manifested within the electronic social networking platform as "pages." FIG. 5A is a diagram of an example of a GUI 500 for an example of an electronic social networking platform within which interests are represented as interest objects that are manifested within the electronic social networking platform as "pages." More particularly, GUI 500 displays the MicroStrategy "page" 502 corresponding to the MicroStrategy interest object that represents the software and technology company, MicroStrategy, within the electronic social networking platform.

As illustrated in FIG. 5A, the MicroStrategy "page" 502 includes a description section 503 that provides background information about MicroStrategy. The MicroStrategy "page" 502 also includes a feed 504 that includes, among other content, messages 506 generated by the MicroStrategy "page" 502 and published to user identities of the electronic social networking platform who have endorsed the MicroStrategy "page" 502 or otherwise established a connection to the MicroStrategy "page" 502 within the electronic social networking platform. In addition, as further illustrated in FIG. 5A, the feed 504 also includes messages 508 posted directly to the MicroStrategy "page" 502 by user identities of the electronic social networking platform. The electronic social networking platform may provide a variety of different mechanisms that enable user identities of the electronic social networking platform to post messages directly to a "page," such as, for example, the MicroStrategy "page" 502. In one example, the electronic social networking platform may enable a user identity to post a message directly to the MicroStrategy "page" 502 by entering text in text entry field 5130 and invoking selectable "Post" control 512. Although not illustrated as such in FIG. 5A, feed 504 also may include various additional or alternative types of content.

The MicroStrategy "page" 502 also includes a selectable "Endorse" control 514 that enables user identities who view the MicroStrategy "page" 502 and who have not already endorsed MicroStrategy to record an endorsement of MicroStrategy as one of their interests. In response to invocation of selectable "Endorse" control 514 by a particular user identity, the electronic social networking platform records that the particular user identity has endorsed MicroStrategy as an interest, for example, by establishing a connection between the user identity and the interest object that represents MicroStrategy within the electronic social networking platform. As illustrated in FIG. 5A, the MicroStrategy "page" 502 also includes an indication 516 reporting that 7,443 user identities already have endorsed MicroStrategy within the electronic social networking platform.

In some electronic social networking platforms, interests endorsed by a particular user identity may be shared with or otherwise made available to other user identities of the electronic social networking platform. In particular, in some electronic social networking platforms, interests endorsed by a particular user identity may be shared with other user identities who are members of the particular user identity's social network. For example, an electronic social networking platform may provide user identities who are members of a particular user identity's social network with access to a detailed user identity profile page that includes, among other information, indications of interests that the particular user identity has endorsed within the electronic social networking platform.

Figure 5B:

FIG. 5B is a diagram of an example of a GUI 550 for an example of an electronic social networking platform that displays a profile page 552 for a user identity of the electronic social networking platform identified as James. As illustrated in FIG. 5B, the profile page 552 for the user identity identified as James includes a basic information section 554 that records certain biographic information about James including James' gender (male), birthday (Jul. 4, 1976), current city (Washington, D.C.), hometown (Chicago, Ill.), relationship status (single), sexual orientation (interested in women), and primary language (English). The profile page 552 for the user identity identified as James also includes a work and education section 556 that records certain information about James' employment and education history including James' employer and role (MicroStrategy (Software Developer)), college/university and degree (Massachusetts Institute of Technology (Electrical Engineering)), and high school (Lincoln Park High School). In addition, the profile page 552 for the user identity identified as James also includes a contact information section 558 that records certain contact information for James including James' mailing address (Washington, D.C.), e-mail address (user2@email.com), and phone number (+1 555 555 1212). Finally, the profile page 552 for the user identity identified as James includes an interests section 560 that lists various different interests that James has endorsed or otherwise recorded within the electronic social networking platform. As illustrated in FIG. 5B, one of the interests that James has endorsed within the electronic social networking platform is MicroStrategy. As described above, James may have recorded his endorsement of MicroStrategy by invoking the "Endorse" control 514 included in the MicroStrategy "page" 502 illustrated in FIG. 5A.

As described above, an electronic social networking platform may enable independent applications to leverage the electronic social networking platform, for example, to provide more compelling user experiences for the users of the independent applications by accessing and/or extracting data from the electronic social networking platforms.

Figure 6A:
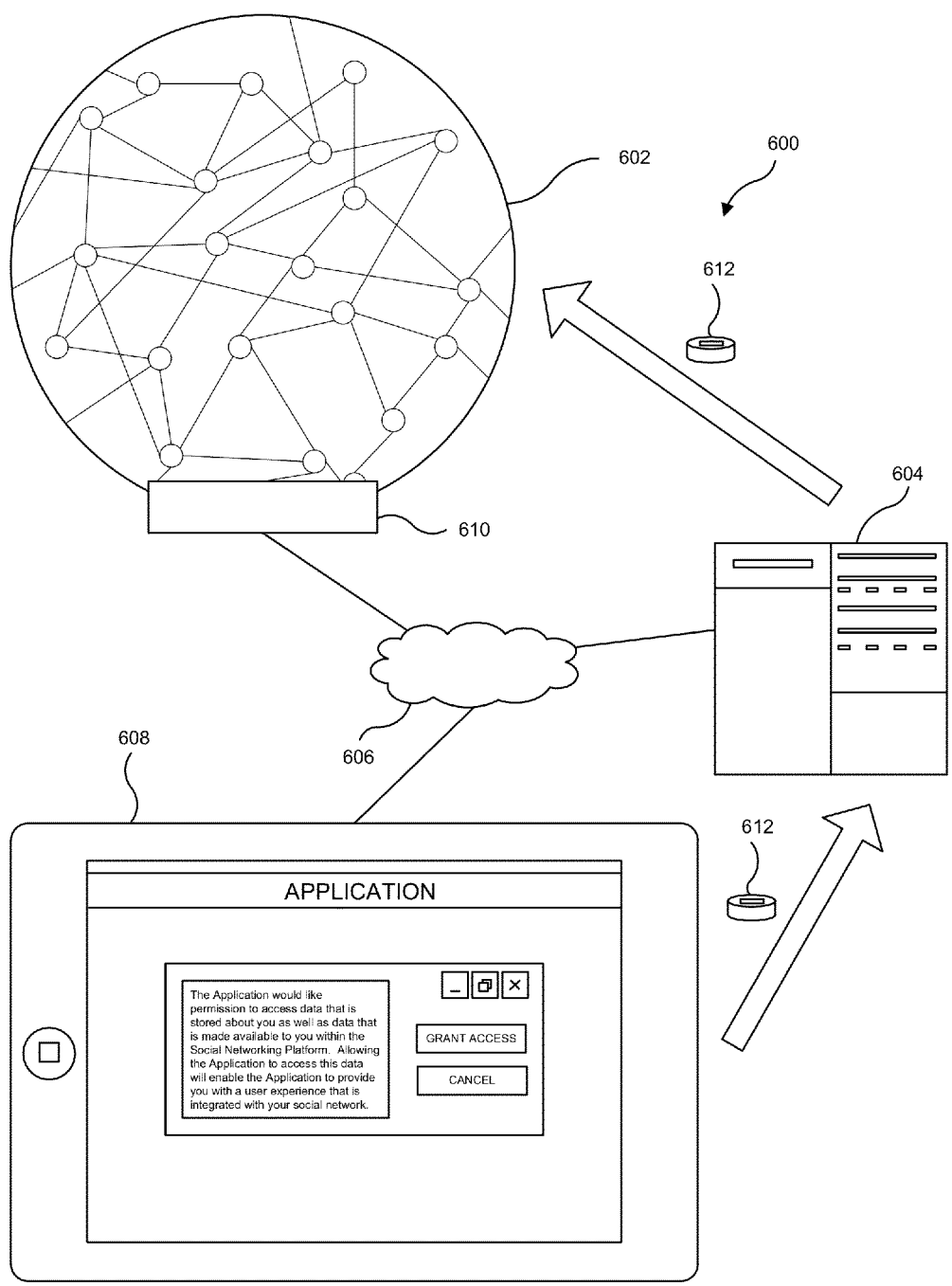
FIGS. 6A and 6B are block diagrams of an example of a network computing environment.
Figure 6B:
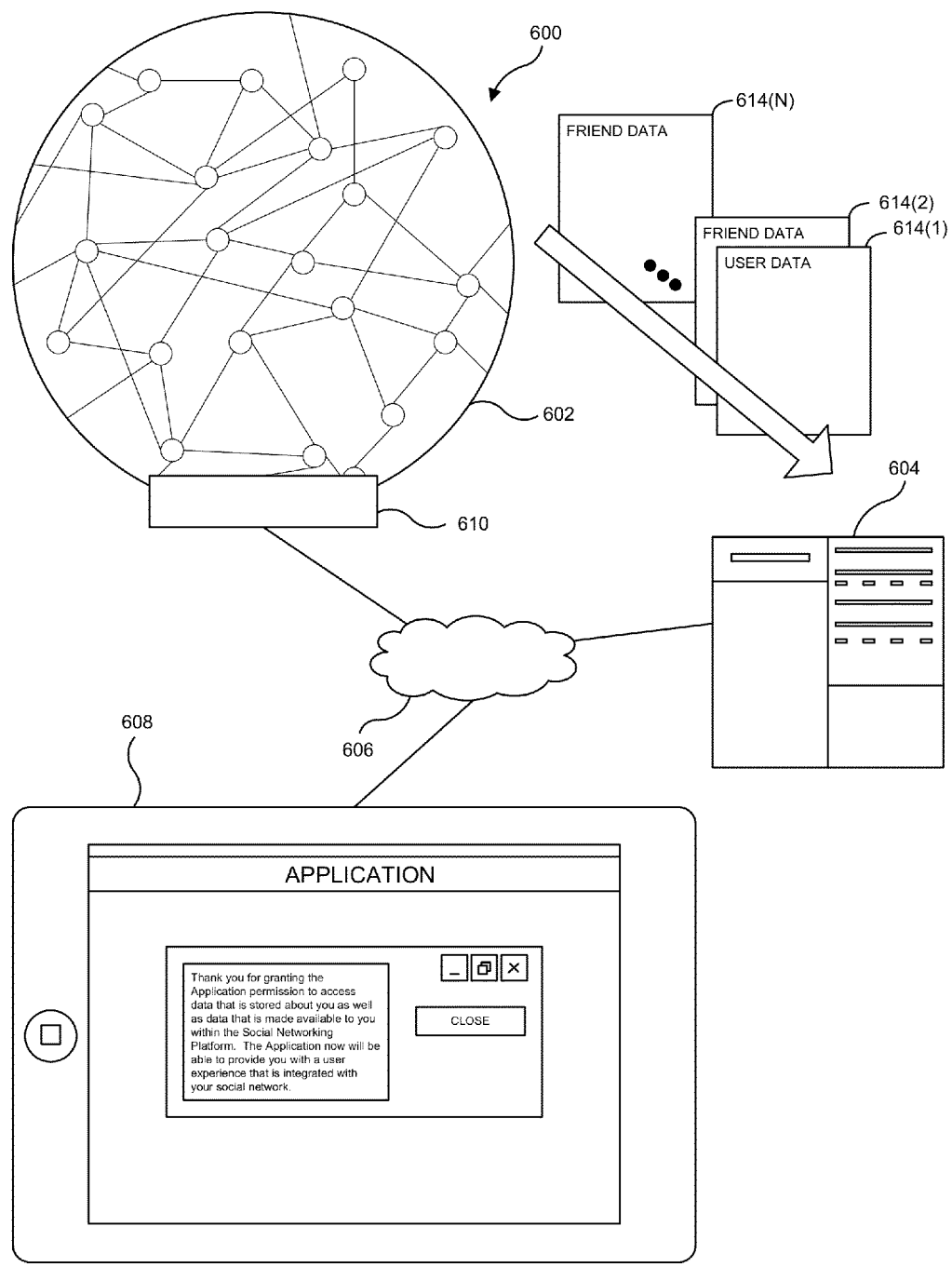

FIGS. 6A-6B are block diagrams of an example of a network computing environment 600 that includes, among other elements, an electronic social networking platform 602 and a computing system 604 that is external to the electronic social networking platform 602 that hosts an application that leverages the electronic social networking platform 602. Electronic social networking platform 602 is accessible to computing system 604 over a network 606. As illustrated in FIGS. 6A-6B, network computing environment 600 also includes a computing device 608. Both electronic social networking platform 602 and computing system 604 may be accessible to computing device 608 over network 606. For illustrative purposes, several elements illustrated in FIGS. 6A-6B and described below are represented as monolithic entities. However, these elements each may include and/or be implemented on numerous interconnected computing devices and other components that are designed to perform a set of specified operations.

Electronic social networking platform 602 may be implemented using one or more computing devices (e.g., servers) configured to provide a service to one or more client devices (e.g., computing device 608) connected to electronic social networking platform 602 over network 606. The one or more computing devices on which electronic social networking platform 602 is implemented may have internal or external storage components storing data and programs such as an operating system and one or more application programs. The one or more application programs may be implemented as instructions that are stored in the storage components and that, when executed, cause the one or more computing devices to provide the features of an electronic social networking platform 602. Furthermore, the one or more computing devices on which electronic social networking platform 602 is implemented each may include one or more processors for executing instructions stored in storage and/or received from one or more other electronic devices, for example over network 606. In addition, these computing devices also typically may include network interfaces and communication devices for sending and receiving data. Electronic social networking platform 602 also may provide an application programming interface (API) 610 that enables other applications to interact with and extract data from the electronic social networking platform 602.

Computing system 604 also may be implemented using one or more computing devices (e.g., servers). The one or more computing devices on which computing system 604 is implemented may have internal or external storage components storing data and programs such as an operating system and one or more application programs. The one or more application programs may be implemented as instructions that are stored in the storage components and that, when executed, cause the one or more computing devices to provide the functionality ascribed herein to the computing system 604. Furthermore, the one or more computing devices on which computing system 604 is implemented each may include one or more processors for executing instructions stored in storage and/or received from one or more other electronic devices, for example, over network 606. In addition, these computing devices also typically may include network interfaces and communication devices for sending and receiving data.

As described in greater detail below, computing system 604 hosts an independent application that leverages electronic social networking platform 602 to provide a service to one or more client devices (e.g., computing device 608). For example, the application may be a credential management application as described above in reference to FIGS. 1 and 2. As such, computing system 604 is configured to extract and store data from electronic social networking platform 602. For example, computing system 604 may be configured to exploit API 610 to extract data from electronic social networking platform 602.

Network 606 may provide direct or indirect communication links between electronic social networking platform 602, computing system 604, and computing device 608. Examples of network 606 include the Internet, the World Wide Web, wide area networks (WANs), local area networks (LANs) including wireless LANs (WLANs), analog or digital wired and wireless telephone networks, radio, television, cable, satellite, and/or any other delivery mechanisms for carrying data.

Computing device 608 may be any of a number of different types of computing devices including, for example, a tablet computer as illustrated in FIGS. 6A-6B, or a mobile phone, a smartphone, a personal digital assistant, a laptop or netbook computer, or a desktop computer. Furthermore, computing device 608 typically may have internal or external storage components for storing data and programs such as an operating system and one or more application programs. In particular, the internal or external storage components for computing device 608 may store a client application for interfacing with electronic social networking platform 602 and/or a client application for interfacing with computing system 604. Additionally or alternatively, computing device 608 may be configured to interface with electronic social networking platform 602 or computing system 604 without a specific client application, using, for example, a web browser. As such, one or more user identities of electronic social networking platform 602 may be able to use computing device 608 to access electronic social networking platform 602. Similarly, one or more users of the independent application that leverages electronic social networking platform 602 hosted by computing system 604 may be able to use computing device 608 to access the independent application.

Computing device 608 also typically may include a central processing unit (CPU) for executing instructions stored in storage and/or received from one or more other electronic devices, for example over network 606. Computing device 608 also usually may include one or more communication devices for sending and receiving data. One example of such communications devices is a modem. Other examples include antennas, transceivers, communications cards, and other network adapters capable of transmitting and receiving data over a network (e.g., network 606) through a wired or wireless data pathway.

As illustrated in FIGS. 6A-6B, the electronic social networking platform 602 may be represented in the form of a graph, where user identities are represented by nodes and connections between user identities are represented by edges connecting the nodes. The electronic social networking platform 602 may enable individual user identities to construct social networks within the electronic social networking platform 602 by establishing connections with other user identities. Electronic social networking platform 602 enables user identities who are members of a social network within electronic social networking platform 602 to share various different types of data and other content (e.g., including electronic messages) with each other within the context of the electronic social networking platform 602.

Furthermore, in addition to the service(s) that electronic social networking platform 602 itself provides to user identities, electronic social networking platform 602 also provides mechanisms (e.g., API 610) that enable independent applications to leverage electronic social networking platform 602 to provide services to user identities of the electronic social networking platform 602. For example, among other features, electronic social networking platform 602 enables user identities of electronic social networking platform 602 to grant access tokens (or some other form of access mechanism or access right (e.g., a password or PIN)) to such independent applications that authorize the independent applications to which the tokens are granted to extract data from electronic social networking platform 602 on behalf of the user identities.

In some implementations, the token (or other form of access mechanism or access right (e.g., a password or PIN)) that a particular user identity grants to an independent application may enable the independent application to access and/or extract the particular user identity's user profile data as well as the user profile data for any other user identities of the electronic social networking platform 602 who are members of the particular user identity's social network within the electronic social networking platform 602. Additionally or alternatively, the token (or other form of access mechanism or access right (e.g., a password or PIN)) that the particular user identity grants to the independent application may enable the independent application to access and/or extract data shared or received by the particular user identity within the electronic social networking platform 602 as well as data shared or received by any other user identities who are members of the particular user identity's social network within the electronic social networking platform 602.

As discussed above, computing system 604 hosts an independent application that leverages electronic social networking platform 602. The electronic social networking platform 602 is accessible to the application hosted by computing system 604 over network 606 and, for example, via API 610. In addition, the application hosted by computing system 604 is accessible to client devices (e.g., computing device 608) also over network 606.

As illustrated in FIG. 6A, in order for the application hosted by computing system 604 to extract data about or otherwise related to a particular user identity and/or other user identities who are members of the particular user identity's social network from electronic social networking platform 602, the particular user identity first may grant the application hosted by computing system 604 a token 612 (or some other form of access mechanism or right (e.g., a password or PIN)) that authorizes the application to extract such data from the electronic social networking platform 602 on behalf of the particular user identity. Upon acquiring a token 612 (or other form of access mechanism or right (e.g., a password or PIN)) for the particular user identity, the application thereafter may transmit the token 612 (or other form of access mechanism or right (e.g., a password or PIN)) to electronic social networking platform 602 along with requests to extract data from the electronic social networking platform 602 on behalf of the particular user identity. (Although FIG. 6A schematically illustrates token 612 (or other form of access mechanism or right (e.g., a password or PIN)) as being transmitted to the application hosted by computing system 604 from the computing device of the particular user identity (e.g., computing device 608), it will be understood that token 612 (or other form of access mechanism or right (e.g., a password or PIN)) actually may be transmitted to the application by the electronic social networking platform 602 (e.g., after being authorized to do so by the particular user identity).)

Referring now to FIG. 6B, when electronic social networking platform 602 receives a request from the application hosted by computing system 604 on behalf of the particular user identity to extract data about or otherwise related to the particular user identity and/or other user identities who are members of the particular user identity's social network from electronic social networking platform 602 that is accompanied by the appropriate token 612 authorizing the application to extract data from the electronic social networking platform 602 on behalf of the particular user identity, the electronic social networking platform 602 locates and returns the requested data 614 about or otherwise related to the particular user identity and/or other user identities who are members of the particular user identity's social network to the application hosted by computing system 604.

In some implementations, the application hosted by computing system 604 may extract the following data 614(1) about or otherwise related to the particular user identity from the electronic social networking platform 602: name; gender; birthday (and/or age); current city; hometown; relationship status; sexual orientation; primary language; employment history; education history; contact information (e.g., mailing address(es), e-mail address(es), phone number(s), etc.); interests recorded with the electronic social networking platform 602 (e.g., by endorsing interest objects manifested as "pages" within the electronic social networking platform 602); "check-ins" registered with the electronic social networking platform 602; event information for events to which the particular user identity has been invited within the context of the electronic social networking platform 602; "status posts" published by the particular user identity to other user identities who are members of the particular user identity's social network and any related responsive comments and/or endorsements; and "wall posts" or "timeline posts" received by the particular user identity.

Additionally or alternatively, the application hosted by computing system 604 also may extract the following data 614(2)-614(N) about or otherwise related to each other user identity who is a member of the particular user identity's social network from the electronic social networking platform: name; gender; birthday (and/or age); current city; hometown; relationship status; sexual orientation; primary language; employment history; education history; contact information (e.g., mailing address(es), e-mail address(es), phone number(s), etc.); interests recorded with the electronic social networking platform 602 (e.g., by endorsing interest objects manifested as "pages" within the electronic social networking platform 602); "check-ins" registered with the electronic social networking platform 602; event information for events to which the user identity has been invited within the context of the electronic social networking platform 602; "status posts" published by the user identity to other user identities who are members of the user identity's social network and any related responsive comments and/or endorsements; and "wall posts" or "timeline posts" received by the user identity.

The application hosted by computing system 604 may extract from the electronic social networking platform 602 data about or otherwise related to each user identity for whom the application hosted by computing system 604 has received a token (or other form of access mechanism or right (e.g., a password or PIN)). Additionally or alternatively, the application hosted by computing system 604 may extract from the electronic social networking platform 602 data about or otherwise related to the other user identities of the electronic social networking platform 602 who are members of the social networks of each user identity for whom the application hosted by computing system 604 has received a token (or other form of access mechanism or right (e.g., a password or PIN)). In this manner, in some implementations, the application hosted by computing system 604 may extract from the electronic social networking platform 602 data about or otherwise related to user identities of the electronic social networking platform who are not also users of the application hosted by computing system 604.

In order to keep the data that is available to the application hosted by computing system 604 generally synchronized with the data in the electronic social networking platform 602, the application hosted by computing system 604 occasionally may repeat the extraction from the electronic social networking platform 602 data about or otherwise related to each user identity for whom the application hosted by computing system 604 has received a token (or other form of access mechanism or right (e.g., a password or PIN)) as well as data about or otherwise related to other user identities of the electronic social networking platform 602 who are members of the social networks of each user identity for whom the application hosted by computing system 604 has received a token (or other form of access mechanism or right (e.g., a password or PIN)).

The application hosted by computing system 604 may use the data extracted from the electronic social networking platform 602 for a variety of different purposes. For example, as suggested above, the application hosted by computing system 604 may process the data extracted from the electronic social networking platform 602 to glean intelligence about the users of the application and/or the other user identities of the electronic social networking platform 602 who are members of the social networks of the users of the application. For example, as discussed above with respect to FIGS. 1 and 2, the application hosted on the computing system 604 may calculate various different characteristics or estimates of various different characteristics of other user identities, who are in the social network of the user identity from whom the application extracted electronic social networking platform data, based on that extracted data. Furthermore, the application may perform such calculations even if the electronic social networking platform itself does not record or make available data about such characteristics.

For instance, the application may estimate a user identity's activity, level of communication, income, affluence, influence, popularity, and/or happiness based on data extracted from the electronic social networking platform for the user identity.

Various different techniques may be employed to estimate a user identity's activity based on information extracted from the electronic social networking platform. For example, an activity score may be calculated for a user identity based on, among other things, the number of status posts generally broadcast by the user identities to their social networks; the number of targeted posts the user identities directed to members of their social networks; the number of locations at which the user identities checked-in; the number of responsive comments that the user identities posted; the number of endorsements by the user identities of communications exchanged within the electronic social networking platform; the number of indications of applications that leverage the electronic social networking platform that the user identities installed; the number of events that occurred for which the user identities received and accepted invitations within the electronic social networking platform; and the number of pages endorsed by the user identities over a defined period of time (e.g., the previous 30 days, the previous 60 days, the previous 90 days, the previous year, etc.).

An activity score may then be calculated for the individual user identities as a function of one or more of these values. For example, in some implementations, the activity score for an individual user identity may be calculated according to the Equation 1 below:

Activity Level=2·(#status posts)+2·(#targeted posts)+2·(#checkins)+(#comments)+0.5·(#comms. endorsed)+3·(#apps installed)+2·(#events attended)+(#pages endorsed)     (Eq. 1)

Various different techniques may be employed to estimate a user identity's level of communication within the electronic social networking platform based on information extracted from the electronic social networking platform. For example, a communicativity score may be calculated for a user identity based on, among other things, counting the number of general status posts the user identities broadcasted generally to their social networks within the previous 30 days; the number of photo status posts the user identities broadcasted generally to their social networks; the number of video status posts the user identities broadcasted generally to their social networks; the number of link status posts the user identities broadcasted generally to their social networks; the number of different locations at which the user identities checked-in; the number of targeted posts the user identities directed to members of their social networks; and the number of responsive comments the user identities posted over a defined period of time (e.g., the previous 30 days, the previous 60 days, the previous 90 days, the previous year, etc.).

A communicativity score may then be calculated for the individual user identities as a function of one or more of these values. For example, in some implementations, the communicativity score for an individual user identity may calculated according to the Equation 2 below:

Comm. Score=2·(#status posts+#photo posts+#link posts+#video posts+#checkins)+(#comments)     (Eq. 2)

Various different techniques may be employed to estimate a user identity's income based on information extracted from the electronic social networking platform. For example, a determination may be made as to whether the user identity likely has an income. This determination may be made based upon one or more of the user identity's age, employment history, and education history. If the user identity has a current employer specified in his/her employment history, the user identity may be determined to have an income irrespective of the user identity's age and/or education history. If the user identity is less than 18 years old and does not have a current employer specified in his/her employment history, the user identity may be determined not to have an income. If the user identity is between 18 years old and 21 years old, does not have a current employer specified in his/her employment history, and does not have a college/university or a graduate school specified in his/her employment history, the user identity may be determined to have an income. In contrast, if the user identity is between 18 years old and 21 years old, does not have a current employer specified in his/her employment history, and does have a college/university or a graduate school specified in his/her employment history, the user identity may be determined not to have an income. If the user identity is between 22 years old and 25 years old, does not have a current employer specified in his/her employment history, and does not have a graduate school specified in his/her employment history, the user identity may be determined to have an income. In contrast, if the user identity is between 22 years old and 25 years old, does not have a current employer specified in his/her employment history, and does have a graduate school specified in his/her employment history, the user identity may be determined to not have an income. If the user identity is between 25 years old and 65 years old and does not have a current employer specified in his/her employment history, the user identity still may be determined to have an income. If the user identity is more than 65 years old and does not have a current employer specified in his/her employment history, the user identity may be determined not to have an income. Finally, if no age information is returned from the electronic social networking platform for the user identity, the application may not be able to estimate the user identity's income.

If the user identity is determined to have an income, a base income then is determined for the user identity. Different techniques may be employed to determine a base income for the user identity. For example, one or more databases may be maintained that store base incomes to be used for user identities based on the current residence locations of the user identities. In some implementations, the same base income may be used for all user identities within a single country. In such implementations, the base income to be used for user identities from each country may be the mean or median income for the country. In other implementations, different base incomes may be used for user identities from a single country. In such implementations, the base incomes to be used may vary at the regional, state, or even city level and may be based on the mean or median incomes for the corresponding regions, states, or cities. For example, the base incomes to be used for user identities residing in one country may be determined based on the cities in the country where the user identities currently reside. More particularly, the base income to be used for a user identity may be the mean income for individuals in the user identity's current residence city. Alternatively, the base income to be used for a user identity may be the median income for individuals in the user identity's current residence city.

After determining the base income for the user identity, age and education level multipliers then are determined for the user identity. The age multiplier for the user identity may be calculated according to Equation 3 below:

$$\text{Age multiplier} = \left( \frac{0.72}{1 + e^{-0.345(age - 24.3)}} + 0.344 \right) \cdot (1 + 0.00481(age - 24.3)) \quad \text{(Eq. 3)}$$

where "age" represents the user identity's age in years.

Meanwhile, the education level multiplier for the user identity depends on the user identity's education history. If the user identity's age is less than 22 years old, the user identity's education level multiplier may be calculated according to Equation 2 below. Similarly, if the user identity's education history specifies a high school but no college/university or graduate school, the user identity's education level multiplier may be calculated according to Equation 4 below:

$$\frac{0.250}{1 + e^{(7.0 \times 10^{-5})(base\ income - 75,000)}} + 0.350 \quad \text{(Eq. 4)}$$

where "base income" represents the base income determined for the user identity as discussed above.

If the user identity's education history specifies a college/university but no graduate school, and the user identity is at least 22 years old or no age is specified for the user identity, the user identity's education multiplier may be calculated according to Equation 3 below. Similarly, if the user identity's education history specifies a graduate school and the user identity is less than 25 years old, the user identity's education level multiplier may be calculated according to Equation 5 below:

$$\frac{0.400}{1+e^{(7.0\times 10^{-5})(base\ income-75,000)}}+0.950 \quad\quad (\text{Eq. 5})$$

where "base income" represents the base income determined for the user identity as discussed above.

If the user identity's education history specifies a graduate school and the user identity is at least 25 years old, the user identity's education level multiplier may be calculated according to Equation 6 below:

$$\frac{0.600}{1+e^{(7.0\times 10^{-5})(base\ income-90,000)}}+1.8 \quad\quad (\text{Eq. 6})$$

where "base income" represents the base income determined for the user identity as discussed above.

The education level multiplier for a user identity who does not satisfy any of the above conditions is "1."

After the age and education level multipliers for the user identity have been determined, the user's estimated income is determined according to Equation 7 below:

est. income=(base income)×(age multiplier)×(education level multiplier)   (Eq. 7)

Various different techniques may be employed to estimate a user identity's affluence based on information extracted from the electronic social networking platform. In one example, an affluence score for a user identity may be determined for the user identity based on the income estimated for the user identity, for example, as described above. More particularly, the affluence score for the user identity may be calculated by dividing the estimated income for the user identity by the highest estimated income for all user identities for which the application is able to calculate an estimated income and then multiplying the result by 100.

Various different techniques may be employed to estimate a user identity's influence based on information extracted from the electronic social networking platform. For example, an influence score may be calculated for a user identity based on the user identity's activity within the electronic social networking platform over a defined period of time (e.g., the previous 30 days, the previous 60 days, the previous 90 days, the previous year, etc.). First, the number of "status posts," M, that the user identity has published within the electronic social networking platform during the defined period of time is determined. In addition, the number of distinct users who endorsed each of the M posts is determined, and the number of distinct users who commented on each of the M posts is determined. A raw influence score for the user identity then may be calculated according to Equation 8 below:

$$\text{raw influence} = \sqrt{M}\cdot\left(\sum_{i=1}^{M}\#\ \text{distinct users endorsing post}_i\right)\cdot \quad (\text{Eq. 8})$$

$$3\left(\sum_{i=1}^{M}\#\ \text{distinct users commenting on post}_i\right)$$

A final influence score for the user identity then is calculated for the user identity by converting the user identity's raw influence score to a logarithmic scale and dividing by a maximum "cut-off" value so that the user identity's final influence score is within the range 0-99 according to Equation 9 below:

$$\text{influence} = 99\times\frac{\log_{10}(1+\text{raw influence})}{\log_{10}(1+\text{Max}(\text{raw influence}))} \quad (\text{Eq. 9})$$

Various different techniques may be employed to estimate a user identity's popularity based on information extracted from the electronic social networking platform. For example, a popularity score may be calculated for a user identity based on targeted "wall" or "timeline" posts from other user identities, "wall" or "timeline" posts from gaming applications, and/or event invitations that the user identity received within the electronic social networking platform over a defined period of time (e.g., the previous 30 days, the previous 60 days, the previous 90 days, the previous year, etc.).

First, the "wall" or "timelines posts from other user identities, the "wall" or "timelines" posts from gaming applications, and the event invitations that the user received within the electronic social networking platform during the defined time period are identified. In addition, the sources of each of the identified "wall" or "timeline" posts from other user identities, the "wall" or "timeline" posts from gaming applications, and the event invitations are identified. Then, for each identified source, i, of "wall" or "timelines posts from other user identities, "wall" or "timeline" posts from gaming applications, and event invitations, a weighted score is calculated according to Equation 10 below:

$$n_{source_i} = (\#\ \text{posts posted}) + \quad (\text{Eq. 10})$$
$$0.1(\#\ \text{of gaming posts}) + 2(\#\ \text{quality event invites sent})$$

where "# of posts posted" represents the number of "wall" or "timeline" posts from a user identity that originated from the source, i, "# of gaming posts" represents the number of "wall" or "timeline" posts from gaming applications that originated from the source, i, and "# quality event invites sent" represents the number of event invitations for which more than a defined threshold of invitees have accepted an invitation that originated from the source, i.

After the score $n_{source_i}$ has been calculated for each source, i, a sum of the scores $n_{source_i}$ for all M sources may be calculated according to Equation 11 below:

$$n_{total}\Sigma_{i=1}^{M}n_{source_i} \quad (\text{Eq. 11})$$

Then, a raw popularity score for the user identity may be calculated according to Equation 12 below:

$$\text{raw popularity} = \sum_{i=1}^{M} n_{source_i} \cdot \left( \log_{10}\left( \frac{n_{total}}{n_{source_i}} \right) \right) \quad \text{(Eq. 12)}$$

A final popularity score for the user identity then is calculated for the user identity by converting the user identity's raw popularity score to a logarithmic scale and dividing by a maximum "cut-off" value so that the user identity's final popularity score is within the range 0-99 according to Equation 13 below:

$$\text{popularity} = 99 \times \frac{\log_{10}(1 + \text{raw\_popularity})}{\log_{10}(1 + \text{Max}(\text{raw\_popularity}))} \quad \text{(Eq. 13)}$$

Various different techniques may be employed to estimate a user identity's happiness based on information extracted from the electronic social networking platform. One particular example is described below.

In this example, a happiness score may be calculated for a user identity based on analyzing extracted status posts of the user identity to determine which, if any, of the status posts are happy status posts and which, if any, of the status posts are unhappy status posts. In some implementations a text analytics/sentiment scoring engine (e.g., Lexalytics' Salience Engine™) may be used to for classifying a status post as happy or unhappy. For example, a post may be passed to the sentiment scoring engine and a sentiment score for the status post received in return. The sentiment score may be used as a proxy for happiness, for example, by classifying a status post returning a positive sentiment score as happy and a status post returning a negative sentiment score as unhappy. (Additional examples of techniques for classifying status posts as being happy or unhappy are described in greater detail below in connection with FIG. 7 and FIGS. 8-9.)

The application then may count the total number of status posts the user identities generally broadcast to their social networks; the number of status posts the user identities broadcast to their social networks that are categorized as being happy; and the number of status posts the user identities broadcast to their social networks that are categorized as being unhappy over a defined period of time (e.g., the previous 30 days, the previous 60 days, the previous 90 days, the previous year, etc.).

A happiness score may then be calculated for the individual user identities as a function of one or more of these values. For example, in some implementations, the happiness score for an individual user identity may calculated according to the Equation 14 below:

$$\text{Happiness} = 5 \cdot (\#\text{happy posts}) - 10 \cdot (\#\text{unhappy posts}) \quad \text{(Eq. 14)}$$

Figure 7:
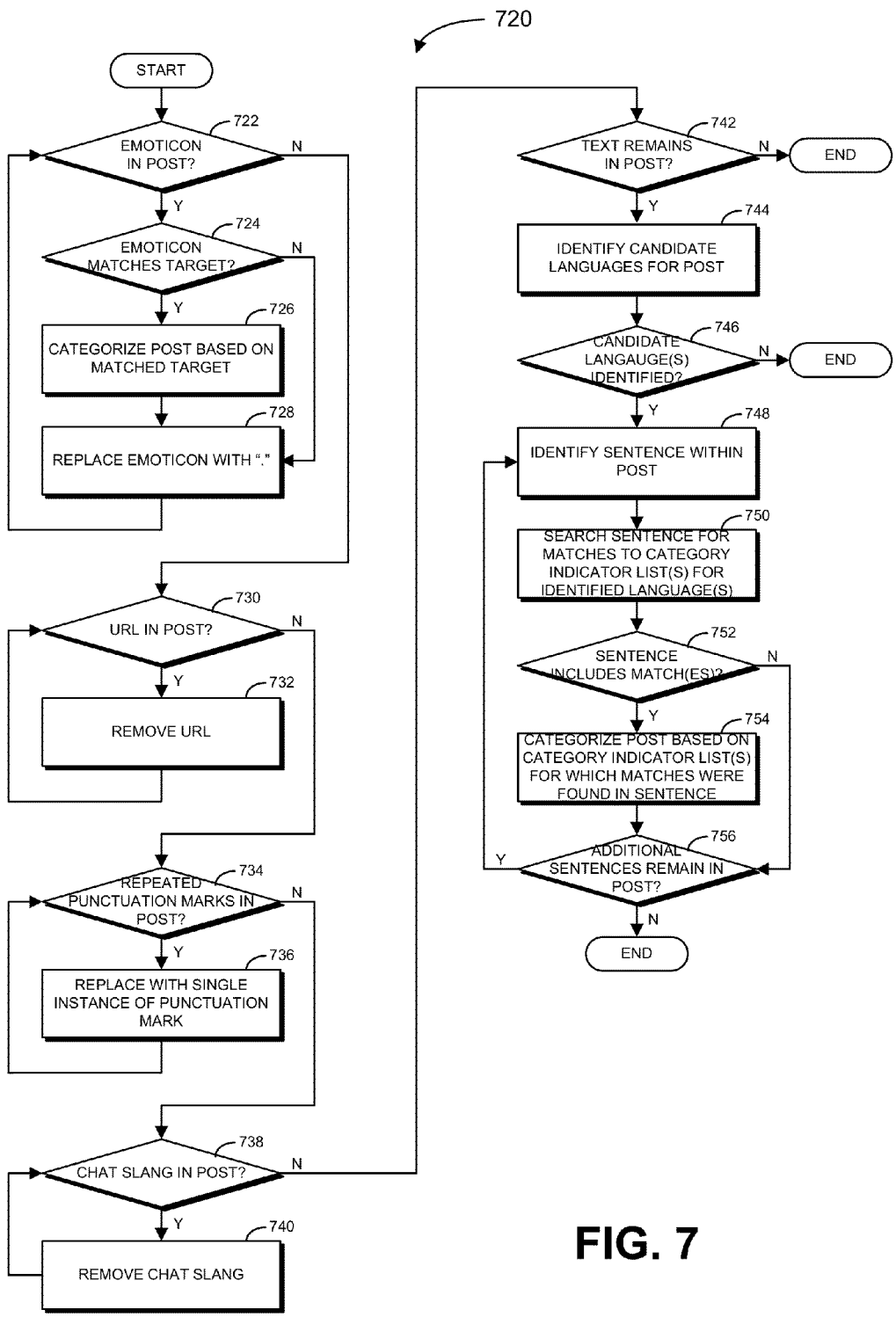
FIG. 7 is a flow that illustrates an example of a process for categorizing a message as a happy or unhappy post.

FIG. 7 is a flow chart 720 that illustrates an example of a process for categorizing a message as a happy or unhappy post (e.g., a post made by a user identity within an electronic social networking platform). The processes illustrated in the flow chart 720 of FIG. 7 may be performed by a computing system, such as, for example, computing system 608 of FIGS. 6A and 6B.

The computing system determines if the message includes any emoticons (722). If the computing system determines that the message includes an emoticon, the computing system proceeds to determine if the emoticon identified in the message matches any target emoticons identified as being indicative of certain categories (724). For example, in some implementations, a first set of target emoticons may be identified as being indicative of happy messages and a second set of target emoticons may be identified as being indicative of unhappy messages. (An example of a set of emoticons that may be indicative of happy messages is presented in Table 1, and an example of a set of emoticons that may be indicative of unhappy messages in presented in Table 2.) In such implementations, the computing system may compare the emoticon identified within the message to the first and second sets of emoticons to determine if the emoticon identified within the message matches any of the emoticons in the first and second sets of emoticons.

TABLE 1

| >:] | [:< | :-) | (-: | :) | :) | (: | :) | (: |
|---|---|---|---|---|---|---|---|---|
| :o) | (o: | :] | [: | :3 | :c) | :> | <: | =] |
| 8) | (8 | =) | (= | :} | {: | :+) | (+: | >:D |
| :-D | :D | 8-D | 8D | x-D | xD | X-D | XD | =-D |
| =D | =-3 | =3 | (y) | \o/ | *\o/* | o/*\o | o/\o | ^5 |
| >_>^ | ^<_< | <3 | :-* | *-: | :* | *: | >B] | B) |
| B-) | 8) | (8 | 8-) | (-8 | >:D | :-D | :D | =-D |
| =D | =-3 | =3 | >;] | [:< | ;-) | (-: | ;) | (; |
| ;) | (; | *-) | (-* | *) | (* | ;-] | [-; | ;] |
| [; | ;D | >B] | B) | B-) | 8-) | (-8 | <3 | (+_+) |
| (^-^) | (^^) | (^.^) | ^_^ | '_' | (~_^) | (^_~) | ~^^~ | (^O^) |
| (^3^) | d(>w<)b | \m/*.*\m/ | 0-0 | | | | | |

TABLE 2

| :( | ): | :-( | )-: | :( | ): | =( | )= | >:[ |
|---|---|---|---|---|---|---|---|---|
| ]:< | :-c | :c | :-< | >-: | :< | >: | :-[ | ]-: |
| :[ | ]: | :{ | }: | >.> | <.< | >.< | -.- | D:< |
| D: | D8 | D; | D= | DX | v.v | D-': | (n) | D:< |
| >:( | >:-C | >:C | >:O | D-:< | >:-( | :-@ | ;( | '_<< |
| D< | </3 | \,,/ | \m/ | >;) | (:< | >;) | (;< | >:-) |
| (-:< | :| | |: | >:\ | >:/ | :-/ | :-. | :/ | :\ |
| =/ | =\ | :S | :'( | )': | ;*( | )*; | T.T | T_T |
| Y.Y | Y_Y | >:X | :-X | :X | :-# | :# | :$ | (>_<) |
| (>.<) | (>_>) | (<_<) | (Ä_Ä) | (-_-) | q(^;)p | (:_:) | (T_T) | (T~T) |
| (ToT) | (T^T) | (._.) | (,_,) | 0.0 | o.0 | O_o | o_O | @_@ |
| O_O | (*_*) | ^///^ | >///< | >///> | o///o | -///- | =///= | x_O |
| O_x | | | | | | | | |

If the computing system determines that the emoticon identified in the message matches a target emoticon identified as being indicative of a certain category, the computing system categorizes the message as belonging to the category of the target emoticon that the emoticon identified within the message matched (726). For example, if the computing system determines that the emoticon identified within the message matches one of the emoticons presented in Table 1, the computing system may categorize the message as a happy message. Similarly, if the computing system determines that the emoticon identified within the message matches one of the emoticons presented in Table 2, the computing system may categorize the message as an unhappy message. In addition to determining if the emoticon identified within the message matches any target emoticons, the computing system also may replace the emoticon identified within the message with a period (i.e., ".") (728). The computing system may repeat operations 724, 726, and 728 for all emoticons identified in the message.

In addition to identifying emoticons in the message, the computing system also may determine if the message includes any uniform resource locators (URLs) (730). For example, the computing system may search the message for character strings beginning with the prefixes "http://" or "https://" and identify as a URL any character string that begins with one of these prefixes. The computing system also may search the message for other character strings or patterns that frequently appear in URLs to identify URLs within the message, for example, in the event that URLs that do not include the "http://" or "https://" are present within the message. If the computing system determines that the message includes a URL, the computing system removes the URL from the message (732). This operation may be repeated for all URLs identified in the message.

In addition to identifying URLs in the message, the computing system also determines if the message includes instances of repeated punctuation marks (734). If the computing system determines that the message includes an instance of a repeated punctuation mark, the computing system replaces the repeated punctuation mark with a single instance of the punctuation mark (736). For example, if the computing system recognizes a repeated string of periods (e.g., ". . . . ."), the computing system may replace the repeated string of periods with a single period (e.g., "."). Similarly, if the computing system recognizes a repeated string of question marks (e.g., "?????") or a repeated string of exclamation marks (e.g., "!!!!!"), the computing system may replace the repeated string of question marks with a single question mark (e.g., "?") or the repeated string of exclamation marks with a single exclamation mark (e.g., "!"). This operation may be repeated for all instances of repeated punctuation marks in the message The computing system also determines if the message includes any instances of so-called chat slang (e.g., "hehehe," or "hahaha"). If the computing system determines that the message includes an instance of chat slang, the computing system removes the chat slang from the message (740). This operation may be repeated for all instances of chat slang identified in the message.

After removing any emoticons, URLs, repeated punctuation marks, and/or chat slang from the message, the computing system then determines if any text remains in the message (742). If no text remains in the message at this point, the process ends. Alternatively, if text remains in the message, the computing system attempts to identify one or more candidate languages for the message (744). (An example of a process for identifying candidate languages for a message is illustrated and described in greater detail below in connection with FIG. 8.) If the computing system is unable to identify a candidate language for the message, the process ends. Alternatively, if the computing system is able to identify one or more candidate languages for the message, the computing system proceeds.

As described in greater detail below, in some implementations, the computing system attempts to categorize the message based on the appearance of certain category indicators (e.g., words, terms, phrases, strings, patterns etc.) in the message. In some implementations, the computing system may maintain different sets of category indicators for each of several different languages. Thus, the computing system may attempt to identify at least two different candidate languages for the message, and then the computing system may attempt to categorize the message using the sets of category indicators for each of the different candidate languages.

After identifying one or more candidate languages for the message, the computing system identifies individual sentences within the post (748). For example, the computing system may identify individual sentences within the message by identifying text strings that conclude with certain sentence-ending punctuation marks (e.g., periods ("."), question marks ("?"), or exclamation marks ("!")).

For each sentence identified within the message, the computing system then searches the sentence for category indicators that match category indicator lists for each of the candidate languages identified for the message (750). (An example of a process for searching text for category indicators that match category indicator lists is illustrated and described in greater detail below in connection with FIG. 9.) Category indicator lists may be available for a number of different categories in a number of different languages. For example, category indicator lists may be available for categorizing messages as happy or unhappy. Example category indicator lists for each of these categories for the English language are provided in Tables 3-5 below.

TABLE 3

| Happy Message Indicators |
| --- |
| thrilled |
| so happy |
| also happy |
| so excited |
| also excited |
| can't wait |
| cannot wait |
| cant wait |
| great* news |
| best news |
| best%day** |
| great*%day** |
| great* time* |
| best time* |
| so blessed |
| looking forward |
| hooray |
| so much fun |
| had a blast |
| in love* |
| yay** |
| woo+hoo |
| woo* hoo** |
| wonderful |
| great*%week* |
| best%week* |
| terrific |
| fantastic* |
| awesome* |
| amazing* |

TABLE 4

| Unhappy Message Indicators |
| --- |
| so sick |
| still sick |
| so upset |
| so angry |
| so stressed |
| so mad |
| bad news |
| awful news |
| terrible news |

TABLE 4-continued

Unhappy Message Indicators bad day**
awful day**
terrible day**
bad mood
disgusted
frustrated
bored*
pissed off
bullshit
bull shit
sucks
fucked
irritated
annoyed
sick and tired
idiot*
moron
morons
moronic

TABLE 5

Birthday Message Indicators birthday
bday
b-day
born day

Within the example category indicator lists presented in Tables 3-5 above, the notations presented below in Table 6 may be used to indicate different rules:

TABLE 6

| Notation | Rule |
| --- | --- |
| "*" | The character string immediately preceding the "*" is a prefix of a word in the text. |
| "" | The character string immediately preceding the "" is a substring of a word in the text. |
| "%" | The two character strings separated by the "%" appear in the text in the indicated order. |
| "+" | The two character strings separated by the "+" appear in single word in the text. |
| "A!B" | The character string (or phrase) that precedes the "!" appears in the text and the character string (or phrase) that follows the "!" does not appear in the text. |
| "!A" | A leading "!" in a category indicator is a negation operator that indicates that text should not be categorized as belonging to the category if the character string or phrase following the "!" appears in the text. |
| "#13" | The text includes an emoticon identified as being indicative of an unhappy mood (e.g., the emoticons included in Table 2). |

Still referring to FIG. 7, if the computing system detects that the sentence includes matches to one or more of the category indicator lists for the candidate language (752), the computing system categorizes the message from which the sentence was taken as belonging to the category of the indicator list(s) for which matches were found in the sentence (754). The computing system may repeat these operations for each sentence identified within the message. After each sentence within the message has been searched for category indicators that match category indicator lists for each of the candidate languages identified for the message, the process may end.

In some implementations, instead of searching individual sentences of a post for matches to category indicator lists, an entire post itself may be searched for matches to category indicator lists irrespective of the number of sentences within the post.

In some implementations, the computing system also may search the message for the word "not." In such implementations, if the computing system has categorized a message as being a happy message or a sad message and the computing system determines that the word "not" is present in the message, the computing system may reverse the happy or sad categorization. For example, if the computing system has categorized a message as being a happy message and the computing system detects the word "not" as being present in the message, the computing system may remove the happy categorization for the message. Similarly, if the computing system has categorized the message as being unhappy and the computing system detects the word "not" as being present in the message, the computing system may remove the unhappy categorization for the message.

Figure 8:
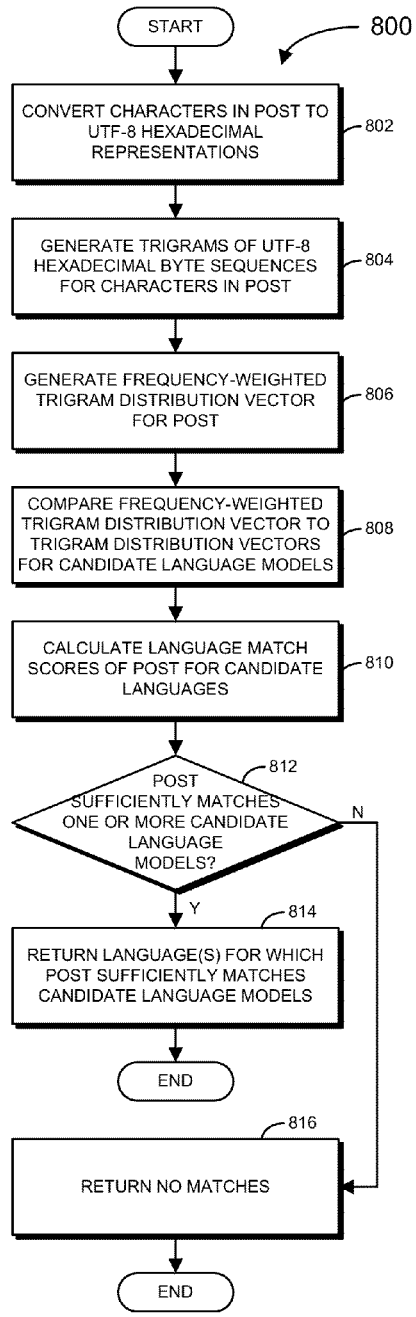
FIG. 8 is a flow chart that illustrates an example of a process for identifying one or more candidate languages for a message.

FIG. 8 is a flow chart 800 that illustrates an example of a process for identifying one or more candidate languages for a message (e.g., a post made by a user identity within an electronic social networking platform). The processes illustrated in the flow chart 800 of FIG. 8 may be performed by a computing system, such as, for example, computing system 408 of FIG. 4.

The computing system converts the characters of the message into their UTF-8 hexadecimal representations (802). Taking the input message "new car" as an example, the computing system would convert the input message to: "6E 65 57 20 63 61 72."

The computing system then uses the UTF-8 hexadecimal representations of the characters in the post to generate trigrams of the UTF-8 hexadecimal byte sequences for the characters in the post (804). Taking the input message "new car" again as an example, the computing system would generate the following trigrams of UTF-8 hexadecimal byte sequences: "6E 65 57," "65 57 20," "57 20 63," "20 63 61," and "63 61 72."

The computing system then generates a frequency-weighted trigram distribution vector for the message (806). For example, the computing system may generate a trigram distribution vector for the message in which each trigram in the message is represented by a corresponding element in the vector and in which the elements of the vector are weighted according to the number of times the trigrams to which they correspond appear in the message.

The computing system then compares the frequency-weighted trigram distribution vector for the message to trigram distribution vectors (or, alternatively, trigram distribution tries) for multiple different candidate language models (808). These trigram distribution vectors (or trigram distribution tries) for the different candidate language models may be derived from a common document that is translated into each of the different candidate languages. For example, a document such as the "Universal Declaration of Human Rights" may be translated into each of the different candidate languages. Each of the resulting versions of the document then may be converted into UTF-8 hexadecimal byte sequence trigrams, from which a trigram distribution vector (or a trigram distribution trie) for the candidate language may be generated.

Based on comparing the frequency-weighted trigram distribution vector for the message to the trigram distribution vectors (or the trigram distribution tries) for the different candidate language models, the computing system calculates language match scores for the message for each of the candidate languages (810). For example, the language match score R for the message for an individual one of the candidate language models may be calculated according to the equation 15 below:

$$R = \frac{\sum_{j=1}^{n} f(u_j) \cdot T_j}{n}, \quad \text{(Eq. 15)}$$

where $$T_j = \begin{cases} 1 & \text{if } u_j \in T \\ 0 & \text{Otherwise} \end{cases}$$

where u represents the trigram distribution vector for the message, $f(u_j)$ represents the number of times the jth trigram appears in the trigram distribution vector for the message, T represents the trigram distribution vector (or trigram distribution trie) for the candidate language model, and n represents the numbers of trigrams in the message.

After calculating the language match scores for the message for each of the candidate languages, the computing system then determines if the message sufficiently matches one or more of the candidate language models (812). For example, the computing system may determine that the message sufficiently matches one of the candidate language models if the language match score for the message for the candidate language exceeds some predefined threshold value.

If the computing system determines that the message sufficiently matches one or more of the candidate language models, the process returns indications of the language(s) for which the message was determined to sufficiently match the candidate language model(s) (814). The process then may end. In some implementations, if the message is determined to sufficiently match multiple candidate language models, the computing system may limit the languages returned to some predefined number of languages that the message is determined to match most closely.

Alternatively, if the message does not sufficiently match any of the candidate language models, the process returns a value indicating that no matches were identified (812). The process then may end.

Figure 9:
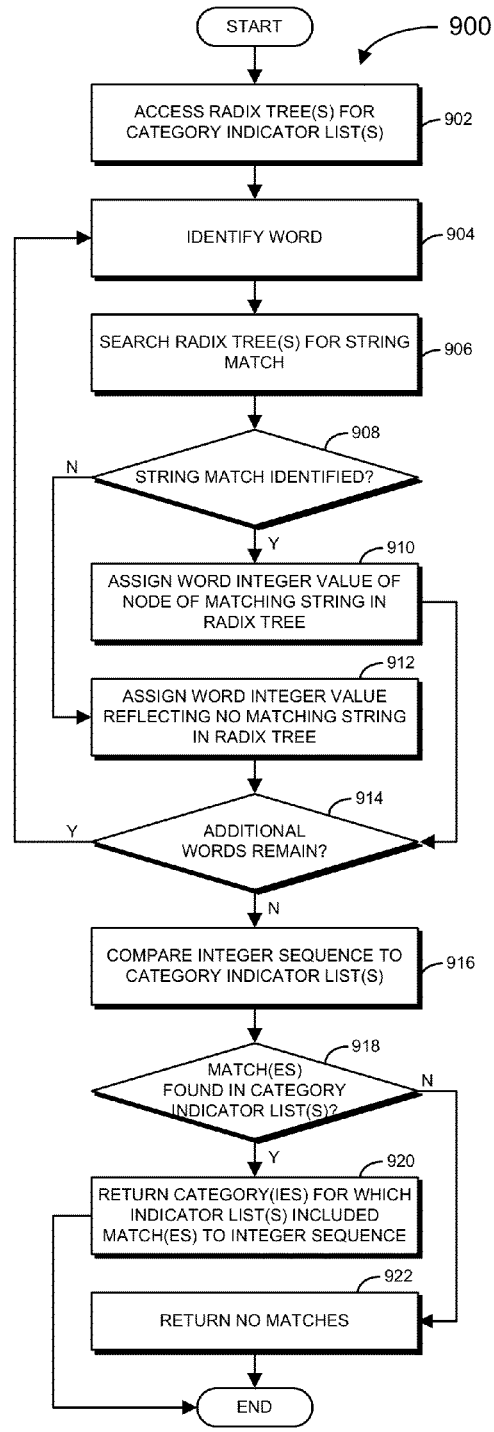
FIG. 9 is a flow chart that illustrates an example of a process for searching text.

FIG. 9 is a flow chart 900 that illustrates an example of a process for searching text (e.g., a post made by a user identity within an electronic social networking platform or a sentence or phrase in a post made by a user identity within an electronic social networking platform) for category indicators that match category indicator lists. For instance, the example process may be used to identify happy and unhappy posts. The processes illustrated in the flow chart 900 of FIG. 9 may be performed by a computing system, such as, for example, computing system 408 of FIG. 9.

The computing system accesses one or more radix tree representations of the category indicator lists (902). In some implementations, if there are multiple category indicator lists, all of the category indicator lists may be represented in a single radix tree. In other implementations, each category indicator list may be represented by its own radix tree.

The computing system then identifies an individual word within the text (904) and searches the radix tree representation(s) of the category indicator lists for strings that match the identified word and/or strings that match substrings within the identified word (906). If the computing system finds a match, the computing system assigns the identified word an integer value that reflects the match and that is specified in the node that represents the matched string within the radix tree representation(s) of the category indicator lists (910).

Alternatively, if the computing system does not find a match, the computing system assigns the identified word an integer value that reflects the absence of a match (e.g., "−1") (912).

The computing system then determines if additional words remain in the text (914), and, if so, repeats this radix tree-based string matching for each word identified within the text. As a result, the computing system converts the text into a sequence of integers. The computing system then compares the integer sequence for the text to integer representations of the category indicators specified in the category indicator lists (916) and attempts to identify matches between the integer sequence representation of the text and the integer representations of the category indicators specified in the category indicator lists (918).

If the computing system determines that there are one or more matches between the integer sequence representation of the text and the integer representations of the category indicators, the computing system returns the category or categories of the category indicator lists for which matches were found in the integer sequence representation of the text (920). The process then may end. Alternatively, if the computing system determines that there are no matches between the integer sequence representation of the text and the integer representations of the category indicators, the computing system returns an indication that no matches were found (922). The process then may end.

Figure 10:
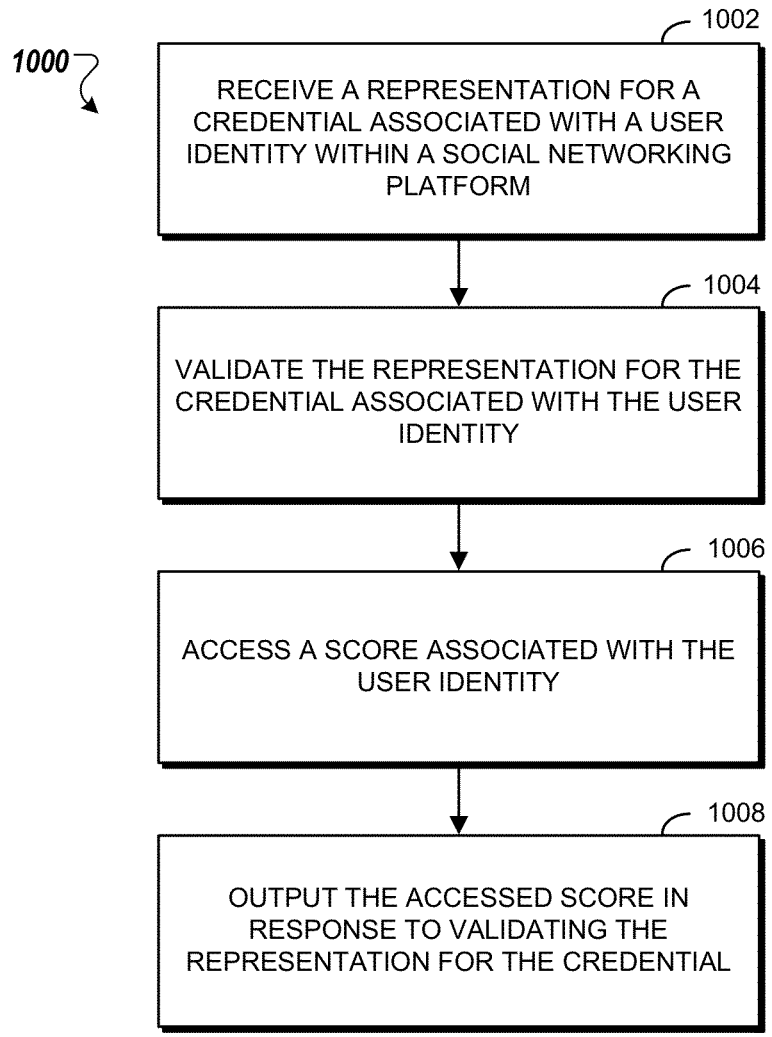
FIG. 10 is a flow chart that illustrates an example process for validating a social credential.

FIG. 10 illustrates an example process 1000 for validating a social credential. The process 1000 may be performed by a client device, such as, for example, client devices 106a and 106b of FIG. 1.

The client device receives a representation for a credential associated with a user identity within a social networking platform (1002). The representation may be rendered on a second client device, where "rendered on" can include, among other things, displaying an alphanumeric code or an optical-machine readable code, or transmitting a sound signal or an NFC code. The representation for the credential may be, for example, an alphanumeric code, an optical-machine readable code (e.g., the QR code 102 shown in FIG. 1), a sound signal, or an NFC code used to encode a credential (e.g., a certificate) associated with a user identity within a electronic social networking platform. The client device may receive the representation for the credential by means of software and hardware appropriate to the medium of the representation of the credential.

Next, the client device validates the representation for the credential associated with the user identity (1004). Validation may include decoding data encoded in the received representation of the credential and comparing the decoded data (which may include a certificate associated with the credential) with data stored on the client device. Alternatively or in addition, the client device may send a validation request to a server including decoded data from the received representation of the credential. The server may then compare the decoded data to data stored on the server and send a validation response to the client device including results of the validation. For instance, the results may include an indication of successful or unsuccessful validation (e.g., screen 110 shown in FIG. 1 or GUI 220 shown in FIG. 2B) and, if the validation is successful, information related to the electronic social networking platform user identity associated with the credential.

Then, the client device accesses a score (e.g., the scores 202 shown in FIG. 2A) associated with the user identity (1006). The client device may use the credential or data associated with the credential (e.g., the user identity) to access social characteristics associated with the user identity within the electronic social networking platform. The social characteristics may include one or more scores calculated based on data associated with a plurality of other user identities who are members of user identity's social network within the electronic social networking platform. The data associated with the plurality of other user identities may be based on interactions by the other user identities with the electronic social networking platform, such as engagement with the electronic social networking platform by the plurality of other user identities or a characteristic of the plurality of other user identities within the electronic social networking platform.

Lastly, the client device outputs the accessed score in response to validating the representation for the credential (1008) (e.g., the GUIs shown in FIG. 2C, 2D, or 2E). In some implementations, the client device outputs a list of multiple scores associated with the user identity within the electronic social networking platform. For example, the scores may include a Friends' Activity score, a Friends' Communicativity score, a Friends' Popularity score, a Friends' Influence score, a Friends' Happiness score, a Friends' Affluence score, a number of friend user identities that the user identity and validator user identity (i.e., a user identity associated with the client device) have in common with in the electronic social networking platform, or a social proximity between the user identity and the validator user identity. The scores may be an average or weighted average of scores calculated for individual user identities that are members of the user identity's social network within the electronic social networking platform.

In some implementations, a request (e.g., control 112 shown in FIG. 1) may be generated to add the user identity to the validator user identity's social network within the electronic social networking platform (i.e., a "friend" request) after successfully validating the social credential. In some implementations, the request may only be generated if one or more of the scores associated with the user identity meets predefined criteria. For example, the predefined criteria may include a threshold value previously set by the user of the client device for a particular social characteristic. Alternatively or in addition, the predefined criteria may include a specified number of mutual friend user identities within the validator user identity's and the user identity's social networks within the electronic social networking platform. The criteria also may include a minimum social proximity between the validator user identity and the user identity within the electronic social networking platform or a condition that the validator user identity and the user identity have a specific mutual friend user identity within the electronic social networking platform, for example.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

A number of implementations of the techniques have been described. Nevertheless, it will be understood that various modifications may be made. For example, although various techniques generally are disclosed herein as being performed externally to an electronic social networking platform, in some implementations, the techniques disclosed herein may be performed internally by an electronic social networking platform.

Furthermore, it should be noted that for situations in which the systems discussed herein collect personal information about users, the users may be provided with an opportunity to opt in/out of programs or features that may collect personal information (e.g., information about a user's preferences or a user's current location). In addition, certain data may be anonymized in one or more ways before it is stored or used, so that personally identifiable information is removed. For example, a user's identity may be anonymized.

The invention claimed is:

1. A non-transitory computer-readable medium storing software comprising instructions, which upon execution by one or more processors, cause the one or more processors to perform operations comprising:

scanning, by one or more processors of a first client device, a representation for a credential rendered on a second client device, the credential being associated with a user identity of a user of the second client device within a social networking platform;

validating, by the one or more processors, the representation for the credential associated with the user identity;

accessing, by the one or more processors, a score associated with the user identity, the score being based on data associated with a plurality of other user identities who are members of a social network associated with the user identity within the social networking platform, wherein the data associated with the plurality of other user identities is based on interaction with the electronic social networking platform by the plurality of other user identities within the electronic social networking platform; and in response to validating the representation for the credential associated with the user identity and accessing the score associated with the user identity, outputting, by the one or more processors, the accessed score for display.

2. The non-transitory computer readable medium of claim 1, further comprising:

determining, by the one or more processors, that the accessed score meets a predefined criterion; and in response to determining that the accessed score meets the predefined criterion, generating, by the one or more processors, a request to add the user identity associated with the credential to a social network within the social networking platform of a validating user identity, the validating user identity being associated with a user of the first client device.

3. The non-transitory computer readable medium of claim 1, further comprising:

determining, by the one or more processors, that the accessed score does not meet a predefined criterion; and in response to determining that the accessed score does not meet the predefined criterion, denying, by the one or more processors, validation of the credential.

4. The non-transitory computer readable medium of claim 1, wherein accessing a score associated with the user identity includes accessing a popularity score reflecting a measure of popularity of other user identities who are members of the social network associated with the user identity within the social networking platform.

5. The non-transitory computer readable medium of claim 1, wherein accessing a score associated with the user identity includes accessing an influence score reflecting a measure of influence of other user identities who are members of the social network associated with the user identity within the social networking platform.

6. The non-transitory computer readable medium of claim 1, wherein accessing a score associated with the user identity includes accessing a happiness score reflecting a measure of happiness of other user identities who are members of the social network associated with the user identity within the social networking platform.

7. The non-transitory computer readable medium of claim 1, wherein accessing a score associated with the user identity includes accessing an affluence score reflecting a measure of affluence of other user identities who are members of the social network associated with the user identity within the social networking platform.

8. The non-transitory computer readable medium of claim 1, wherein a user of the first client device is associated with a validating user identity within the social networking platform, and further comprising accessing information identifying common friends between the validating user identity and the user identity of the user of the second client device within the social networking platform.

9. The non-transitory computer readable medium of claim 1, wherein a user of the first client device is associated with a validating user identity within the social networking platform, and further comprising accessing information related to degrees of separation between the validating user identity and the user identity of the user of the second client device within the social networking platform.

10. The non-transitory computer readable medium of claim 1, wherein scanning, at the first client device, a representation for a credential from a second client device includes scanning, at the first client device, a Quick Response code displayed on the second client device.

11. The non-transitory computer readable medium of claim 1, wherein accessing a score associated with the user identity includes accessing a plurality of scores associated with the user identity, the plurality of scores begin based on data associated with a plurality of other user identities who are members of the social network associated with the user identity within the social networking platform, the data associated with the plurality of other user identities being based on interaction with the electronic social networking platform by the plurality of other user identities within the electronic social networking platform, and wherein outputting the accessed score for display comprises outputting the plurality of scores.

12. The non-transitory computer readable medium of claim 1, wherein accessing a score associated with the user identity includes accessing a histogram representation of the score, and wherein outputting the accessed score for display comprises outputting the histogram representation of the score.

13. A system comprising:

one or more computers and one or more storage devices storing instructions that are operable, when executed by the one or more computers, to cause the one or more computers to perform operations comprising:

scanning, by one or more processors, a representation for a credential rendered on a second client device, the credential being associated with a user identity of a user of the second client device within a social networking platform;

validating, by the one or more processors, the representation for the credential associated with the user identity;

accessing, by the one or more processors, a score associated with the user identity, the score being based on data associated with a plurality of other user identities who are members of a social network associated with the user identity within the social networking platform, wherein the data associated with the plurality of other user identities is based on interaction with the electronic social networking platform by the plurality of other user identities within the electronic social networking platform; and in response to validating the representation for the credential associated with the user identity and accessing the score associated with the user identity, outputting, by the one or more processors, the accessed score for display.

14. The system of claim 13, further comprising:

determining, by the one or more processors, that the accessed score meets a predefined criterion; and in response to determining that the accessed score meets the predefined criterion, generating, by the one or more processors, a request to add the user identity associated with the credential to a social network within the social networking platform of a validating user identity, the validating user identity being associated with a user of the first client device.

15. The system of claim 13, further comprising:

determining, by the one or more processors, that the accessed score does not meet a predefined criterion; and in response to determining that the accessed score does not meet the predefined criterion, denying, by the one or more processors, validation of the credential.

16. The system of claim 13, wherein a user of the first client device is associated with a validating user identity within the social networking platform, and further comprising accessing information identifying common friends between the validating user identity and the user identity of the user of the second client device within the social networking platform.

17. A computer-implemented method comprising:
- scanning, at a first client device, a representation for a credential rendered on a second client device, the credential being associated with a user identity of a user of the second client device within a social networking platform;
- validating, at the first client device, the representation for the credential associated with the user identity;
- accessing, by the first client device, a score associated with the user identity, the score being based on data associated with a plurality of other user identities who are members of a social network associated with the user identity within the social networking platform, wherein the data associated with the plurality of other user identities is based on interaction with the electronic social networking platform by the plurality of other user identities within the electronic social networking platform; and
- in response to validating the representation for the credential associated with the user identity and accessing the score associated with the user identity, outputting, by the first client device, the accessed score for display.

18. The computer implemented method of claim 17, further comprising:
- determining, by the first client device, that the accessed score meets a predefined criterion; and
- in response to determining that the accessed score meets the predefined criterion, generating a request to add the user identity associated with the credential to a social network within the social networking platform of a validating user identity, the validating user identity being associated with a user of the first client device.

19. The computer implemented method of claim 17, further comprising:
- determining, by the first client device, that the accessed score does not meet a predefined criterion; and
- in response to determining that the accessed score does not meet the predefined criterion, denying validation of the credential.

20. The computer implemented method of claim 17, wherein a user of the first client device is associated with a validating user identity within the social networking platform, and further comprising accessing information identifying common friends between the validating user identity and the user identity of the user of the second client device within the social networking platform.

* * * * *